United States Patent
Hendry et al.

(10) Patent No.: US 11,973,939 B2
(45) Date of Patent: *Apr. 30, 2024

(54) GRADUAL DECODING REFRESH IN VIDEO CODING

(71) Applicant: Huawei Technologies Co., Ltd., Shenzhen (CN)

(72) Inventors: Fnu Hendry, San Diego, CA (US); Ye-Kui Wang, San Diego, CA (US); Jianle Chen, San Diego, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/156,943

(22) Filed: Jan. 19, 2023

(65) Prior Publication Data

US 2023/0156184 A1    May 18, 2023

Related U.S. Application Data

(63) Continuation of application No. 17/470,776, filed on Sep. 9, 2021, now Pat. No. 11,632,545, which is a (Continued)

(51) Int. Cl.
*H04N 19/107* (2014.01)
*H04N 19/14* (2014.01)
(Continued)

(52) U.S. Cl.
CPC ........... *H04N 19/107* (2014.11); *H04N 19/14* (2014.11); *H04N 19/162* (2014.11);
(Continued)

(58) Field of Classification Search
CPC .... H04N 19/16; H04N 19/174; H04N 19/188; H04N 19/1883
See application file for complete search history.

(56) References Cited

U.S. PATENT DOCUMENTS

| | | | |
|---|---|---|---|
| 11,632,545 B2 * | 4/2023 | Hendry | H04N 19/14 375/240.02 |
| 2004/0066854 A1 * | 4/2004 | Hannuksela | H04N 19/70 375/E7.199 |

(Continued)

FOREIGN PATENT DOCUMENTS

WO    2013163569 A1    10/2013

OTHER PUBLICATIONS

Document: JVET-M0161-v2, Chen, L., et al., "AHG17: Signalling random access properties in the NAL unit header," Joint Video Experts Team (JVET) of ITU-T SG 16 WP 3 and ISO/IEC JTC 1/SC 29/WG 11, 13th Meeting: Marrakech, MA, Jan. 9-18, 2019, 6 pages.
(Continued)

*Primary Examiner* — Shawn S An
(74) *Attorney, Agent, or Firm* — Conley Rose, P.C.

(57) ABSTRACT

A method of decoding a coded video bitstream implemented by a video decoder is disclosed. The method includes determining that a coded video sequence (CVS) of the coded video bitstream includes a video coding layer (VCL) network abstraction layer (NAL) unit having a gradual decoding refresh (GDR) network abstraction layer (NAL) unit type (GDR_NUT), the VCL NAL unit having the GDR_NUT containing a GDR picture; initiating decoding of the CVS at the GDR picture; and generating an image according to the CVS as decoded. A corresponding method of encoding is also disclosed.

15 Claims, 10 Drawing Sheets

Related U.S. Application Data continuation of application No. PCT/US2020/022179, filed on Mar. 11, 2020.

(60) Provisional application No. 62/816,722, filed on Mar. 11, 2019, provisional application No. 62/871,020, filed on Jul. 5, 2019.

(51) Int. Cl.
| | |
|---|---|
| *H04N 19/162* | (2014.01) |
| *H04N 19/169* | (2014.01) |
| *H04N 19/172* | (2014.01) |
| *H04N 19/174* | (2014.01) |
| *H04N 19/30* | (2014.01) |
| *H04N 19/46* | (2014.01) |

(52) U.S. Cl.
CPC ......... *H04N 19/172* (2014.11); *H04N 19/174* (2014.11); *H04N 19/188* (2014.11); *H04N 19/1883* (2014.11); *H04N 19/30* (2014.11); *H04N 19/46* (2014.11)

(56) References Cited

U.S. PATENT DOCUMENTS

| | | | |
|---|---|---|---|
| 2004/0260827 | A1 | 12/2004 | Wang |
| 2008/0205511 | A1 | 8/2008 | Hannuksela et al. |
| 2012/0185570 | A1 | 7/2012 | Bouazizi et al. |
| 2013/0077681 | A1 | 3/2013 | Chen et al. |
| 2013/0107953 | A1 | 5/2013 | Chen et al. |
| 2013/0114735 | A1* | 5/2013 | Wang .................. H04N 19/176 375/E7.231 |
| 2014/0003536 | A1 | 1/2014 | Wang et al. |
| 2014/0016697 | A1 | 1/2014 | Wang |
| 2014/0092963 | A1 | 4/2014 | Wang |
| 2014/0192896 | A1 | 7/2014 | Wang et al. |
| 2014/0192897 | A1 | 7/2014 | Wang et al. |
| 2014/0355692 | A1 | 12/2014 | Ramasubramonian et al. |
| 2015/0063790 | A1 | 3/2015 | Rodriguez et al. |
| 2015/0156501 | A1* | 6/2015 | Hannuksela ............ H04N 19/70 375/240.12 |
| 2015/0195555 | A1* | 7/2015 | Hendry .................. H04N 19/30 375/240.16 |
| 2015/0271525 | A1* | 9/2015 | Hendry ................ H04N 19/107 375/240.27 |
| 2016/0100181 | A1 | 4/2016 | Toda |
| 2016/0112712 | A1 | 4/2016 | Wang et al. |
| 2016/0234517 | A1* | 8/2016 | Samuelsson ......... H04N 19/187 |
| 2017/0111642 | A1 | 4/2017 | Hendry et al. |
| 2020/0066854 | A1* | 2/2020 | Nelson .............. H01L 29/41791 |
| 2020/0177923 | A1 | 6/2020 | Chen et al. |

OTHER PUBLICATIONS

Hannuksela, et al., "Isolated regions in video coding," In: IEEE Transactions on Multimedia 6.2., Apr. 2004, pp. 259-267.

Bross, B., et al., "Versatile Video Coding (Draft 4)," Joint Video Experts Team (JVET) of ITU-T SG 16 WP 3 and ISO/IEC JTC 1/SC 29/WG 11, 13th Meeting: Marrakech, MA, JVET-M1001-v5, Jan. 9-18, 287 pages.

"Line Transmission of Non-Telephone Signals, Video Codec for Audiovisual Services at p x 64 kbits," ITU-T, H.261, Mar. 1993, 29 pages.

"Transmission of Non-Telephone Signals, Information Technology—Generic Coding of Moving Pictures and Associated Audio Information: Video," H.262, Jul. 1995, 211 pages.

"Series H: Audiovisual and Multimedia Systems, Infrastructure of audiovisual services—Coding of moving video, Video coding for low bit rate communication," ITU-T, H.263, Jan. 2005, 226 pages.

"Series H: Audiovisual and Multimedia Systems, Infrastructure of audiovisual services—Coding of moving video, Advanced video coding for generic audiovisual services," ITU-T, H.264, Jun. 2019, 836 pages.

"Series H: Audiovisual and Multimedia Systesm, Infrastructure of audiovisual services—Coding of moving video, High efficiency video coding," H.265, Apr. 2013, 317 pages.

Document: JVET- K0212-v1, "Improved Cyclic Intra Refresh," Joint Video Experts Team (JVET) of ITU-T SG 16 WP 3 and ISO/IEC JTC 1/SC 29/WG 11, 11th Meeting: Ljubljana, SI, Jul. 10-18, 2018, 4 pages.

Document: JCTVC-L0160, "TEC5: Cross-verification of TEC5 Test 5.1.5 inter-layer intra mode prediction (JCTVC- J0153)," Joint Collaborative Team on Video Coding (JCT-VC) of ITU-T SG 16 WP 3 and ISO/IEC JTC 1/SC 29/WG 11, 12th Meeting: Geneva, CH, Jan. 14-23, 2013, 3 pages.

Document: JVET-M0529-v1, "AHG14: Normative Recovery Point Indication," Joint Video Experts Team (JVET) of ITU-T SG 16 WP 3 and ISO/IEC JTC 1/SC 29/WG 11, 14th Meeting: Marrakesh, MA, Jan. 9-18, 2019, 8 pages.

Document: JVT-D097, Wang, Y.K. et al., "On Random Access", Joint Video Team (JVT) of ISO/IEC MPEG & ITU-T VCEG (ISO-IEC JTC1/SC29/WG11 and ITU-T SG.16 Q.6) 4th Meeting: Klagenfurt, Austria, Jul. 22-26, 2002 XP030005371, 13 pages.

Document: JVET-N0115-v1, Hendry, et al., "AHG14/AHG17: GDR—Gradual decoding refresh," Joint Video Experts Team (JVET) of ITU-T SG 16 WP 3 and ISO/IECJTC 1/SC 29/WG11, 14th Meeting: Geneva, CH, Mar. 19-27, 2019, 5 pages, XP030202639.

Wang, Y.K., "Issues of Gradual Decoding Refresh in AVC File Format," International Organisation for Standardisation ISO/IEC JTC1/SC29/WG11 Coding of Moving Pictures and Audio MPEG2003/M9853, Jul. 2003, XP030038744, 5 pages.

\* cited by examiner

GRADUAL DECODING REFRESH IN VIDEO CODING

CROSS-REFERENCE TO RELATED APPLICATIONS

This patent application is a continuation of U.S. Provisional patent application Ser. No. 17/470,776, filed Sep. 9, 2021, Ye-Kui Wang, et al., and titled "Gradual Decoding Refresh in Video Coding," which claims the benefit of International Application No. PCT/US2020/022179, filed Mar. 11, 2020 by Ye-Kui Wang, et. al., and titled "Gradual Decoding Refresh In Video Coding," U.S. Provisional Patent Application No. 62/816,722, filed Mar. 11, 2019, by Fnu Hendry, et al., and titled "Gradual Decoding Refresh in Video Coding," and U.S. Provisional Patent Application No. 62/871,020, filed Jul. 5, 2019, by Fnu Hendry, et al., and titled "Gradual Decoding Refresh in Video Coding," each of which is hereby incorporated by reference.

TECHNICAL FIELD

In general, this disclosure describes techniques supporting gradual decoding refresh in video coding. More specifically, this disclosure allows progressive intra refresh to enable random access without having to use intra random access point (IRAP) pictures.

BACKGROUND

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in image quality are desirable.

SUMMARY

A first aspect relates to a method of decoding a coded video bitstream implemented by a video decoder. The method includes determining, by the video decoder, that a coded video sequence (CVS) of the coded video bitstream includes a video coding layer (VCL) network abstraction layer (NAL) unit having a gradual decoding refresh (GDR) network abstraction layer (NAL) unit type (GDR_NUT), the VCL NAL unit having the GDR_NUT containing a GDR picture; initiating, by the video decoder, decoding of the CVS at the GDR picture; and generating, by the video decoder, an image according to the CVS as decoded.

The method provides techniques that allow progressive intra refresh to enable random access without having to use an intra random access point (IRAP) picture. A video coding layer (VCL) network abstraction layer (NAL) unit has a gradual decoding refresh (GDR) network abstraction layer (NAL) unit type (GDR_NUT) to indicate that the VCL NAL unit contains a GDR picture. By using a GDR picture instead of IRAP picture, a smoother, more consistent bitrate may be achieved due to, for example, the size of a GDR picture relative to the size of an TRAP picture, which allows for reduced end to end delay (i.e., latency). Therefore, the coder/decoder (a.k.a., "codec") in video coding is improved relative to current codecs. As a practical matter, the improved video coding process offers the user a better user experience when videos are sent, received, and/or viewed.

In a first implementation form of the method according to the first aspect as such, the GDR picture is an initial picture in the CVS.

In a second implementation form of the method according to the first aspect as such or any preceding implementation form of the first aspect, the GDR picture is an initial picture in a GDR period.

In a third implementation form of the method according to the first aspect as such or any preceding implementation form of the first aspect, the GDR picture has a temporal identifier (ID) equal to zero.

In a fourth implementation form of the method according to the first aspect as such or any preceding implementation form of the first aspect, an access unit containing the VCL NAL unit having the GDR_NUT is designated a GDR access unit.

In a fifth implementation form of the method according to the first aspect as such or any preceding implementation form of the first aspect, wherein the GDR_NUT indicates to the video decoder that the VCL NAL unit having the GDR_NUT contains the GDR picture A second aspect relates to a method of encoding a video bitstream implemented by a video encoder. The method includes determining, by the video encoder, a random access point for a video sequence; encoding, by the video encoder, a gradual decoding refresh (GDR) picture into a video coding layer (VCL) network abstraction layer (NAL) unit having a gradual decoding refresh (GDR) network abstraction layer (NAL) unit type (GDR_NUT) at the random access point for the video sequence; generating, by the video encoder, a bitstream containing the video sequence having the GDR picture in the VCL NAL unit with the GDR_NUT at the random access point; and storing, by the video encoder, the bitstream for transmission toward a video decoder.

The method provides techniques that allow progressive intra refresh to enable random access without having to use an intra random access point (IRAP) picture. A video coding layer (VCL) network abstraction layer (NAL) unit has a gradual decoding refresh (GDR) network abstraction layer (NAL) unit type (GDR_NUT) to indicate that the VCL NAL unit contains a GDR picture. By using a GDR picture instead of IRAP picture, a smoother, more consistent bitrate may be achieved due to, for example, the size of a GDR picture relative to the size of an IRAP picture, which allows for reduced end to end delay (i.e., latency). Therefore, the coder/decoder (a.k.a., "codec") in video coding is improved relative to current codecs. As a practical matter, the improved video coding process offers the user a better user experience when videos are sent, received, and/or viewed.

In a first implementation form of the method according to the second aspect as such, the GDR picture is an initial picture in the CVS.

In a second implementation form of the method according to the second aspect as such or any preceding implementation form of the second aspect, the GDR picture is an initial picture in a GDR period.

In a third implementation form of the method according to the second aspect as such or any preceding implementation form of the second aspect, the GDR picture has a temporal identifier (ID) equal to zero.

In a fourth implementation form of the method according to the second aspect as such or any preceding implementation form of the second aspect, the VCL NAL unit having the GDR_NUT is designated a GDR access unit.

In a fifth implementation form of the method according to the second aspect as such or any preceding implementation form of the second aspect, wherein the GDR_NUT indicates to the video decoder that the VCL NAL unit having the GDR_NUT contains the GDR picture A third aspect relates to a decoding device. The decoding device includes a receiver configured to receive a coded video bitstream; a memory coupled to the receiver, the memory storing instructions; and a processor coupled to the memory, the processor configured to execute the instructions to cause the decoding device to: determine that a coded video sequence (CVS) of the coded video bitstream includes a video coding layer (VCL) network abstraction layer (NAL) unit having a gradual decoding refresh (GDR) network abstraction layer (NAL) unit type (GDR_NUT), the VCL NAL unit having the GDR_NUT containing a GDR picture; initiate decoding of the CVS at the GDR picture; and generate an image according to the CVS as decoded.

The decoding device provides techniques that allow progressive intra refresh to enable random access without having to use an intra random access point (IRAP) picture. A video coding layer (VCL) network abstraction layer (NAL) unit has a gradual decoding refresh (GDR) network abstraction layer (NAL) unit type (GDR_NUT) to indicate that the VCL NAL unit contains a GDR picture. By using a GDR picture instead of IRAP picture, a smoother, more consistent bitrate may be achieved due to, for example, the size of a GDR picture relative to the size of an IRAP picture, which allows for reduced end to end delay (i.e., latency). Therefore, the coder/decoder (a.k.a., "codec") in video coding is improved relative to current codecs. As a practical matter, the improved video coding process offers the user a better user experience when videos are sent, received, and/or viewed.

In a first implementation form of the decoding device according to the third aspect as such, the decoding device further comprises a display configured to display the image as generated.

A fourth aspect relates to an encoding device. The encoding device includes a memory containing instructions; a processor coupled to the memory, the processor configured to implement the instructions to cause the encoding device to: determine a random access point for a video sequence; encode a gradual decoding refresh (GDR) picture into a video coding layer (VCL) network abstraction layer (NAL) unit having a gradual decoding refresh (GDR) network abstraction layer (NAL) unit type (GDR_NUT) at the random access point for the video sequence; and generate a bitstream containing the video sequence having the GDR picture in the VCL NAL unit with the GDR_NUT at the random access point; and a transmitter coupled to the processor, the transmitter configured to transmit the bitstream toward a video decoder.

The encoding device provides techniques that allow progressive intra refresh to enable random access without having to use an intra random access point (IRAP) picture. A video coding layer (VCL) network abstraction layer (NAL) unit has a gradual decoding refresh (GDR) network abstraction layer (NAL) unit type (GDR_NUT) to indicate that the VCL NAL unit contains a GDR picture. By using a GDR picture instead of IRAP picture, a smoother, more consistent bitrate may be achieved due to, for example, the size of a GDR picture relative to the size of an TRAP picture, which allows for reduced end to end delay (i.e., latency). Therefore, the coder/decoder (a.k.a., "codec") in video coding is improved relative to current codecs. As a practical matter, the improved video coding process offers the user a better user experience when videos are sent, received, and/or viewed.

In a first implementation form of the encoding device according to the fourth aspect as such, the memory stores the bitstream prior to the transmitter transmitting the bitstream toward the video decoder.

A fifth aspect relates to a coding apparatus. The coding apparatus includes a receiver configured to receive a picture to encode or to receive a bitstream to decode; a transmitter coupled to the receiver, the transmitter configured to transmit the bitstream to a decoder or to transmit a decoded image to a display; a memory coupled to at least one of the receiver or the transmitter, the memory configured to store instructions; and a processor coupled to the memory, the processor configured to execute the instructions stored in the memory to perform any of the methods disclosed herein.

The coding apparatus provides techniques that allow progressive intra refresh to enable random access without having to use an intra random access point (IRAP) picture. A video coding layer (VCL) network abstraction layer (NAL) unit has a gradual decoding refresh (GDR) network abstraction layer (NAL) unit type (GDR_NUT) to indicate that the VCL NAL unit contains a GDR picture. By using a GDR picture instead of IRAP picture, a smoother, more consistent bitrate may be achieved due to, for example, the size of a GDR picture relative to the size of an IRAP picture, which allows for reduced end to end delay (i.e., latency). Therefore, the coder/decoder (a.k.a., "codec") in video coding is improved relative to current codecs. As a practical matter, the improved video coding process offers the user a better user experience when videos are sent, received, and/or viewed.

A sixth aspect relates to a system. The system includes an encoder; and a decoder in communication with the encoder, wherein the encoder or the decoder includes the decoding device, the encoding device, or the coding apparatus disclosed herein.

The system provides techniques that allow progressive intra refresh to enable random access without having to use an intra random access point (IRAP) picture. A video coding layer (VCL) network abstraction layer (NAL) unit has a gradual decoding refresh (GDR) network abstraction layer (NAL) unit type (GDR_NUT) to indicate that the VCL NAL unit contains a GDR picture. By using a GDR picture instead of IRAP picture, a smoother, more consistent bitrate may be achieved due to, for example, the size of a GDR picture relative to the size of an TRAP picture, which allows for reduced end to end delay (i.e., latency). Therefore, the coder/decoder (a.k.a., "codec") in video coding is improved relative to current codecs. As a practical matter, the improved video coding process offers the user a better user experience when videos are sent, received, and/or viewed.

A seventh aspect relates to a means for coding. The means for coding includes receiving means configured to receive a picture to encode or to receive a bitstream to decode;

transmission means coupled to the receiving means, the transmission means configured to transmit the bitstream to a decoding means or to transmit a decoded image to a display means; storage means coupled to at least one of the receiving means or the transmission means, the storage means configured to store instructions; and processing means coupled to the storage means, the processing means configured to execute the instructions stored in the storage means to perform any of the methods disclosed herein.

The means for coding provides techniques that allow progressive intra refresh to enable random access without having to use an intra random access point (IRAP) picture. A video coding layer (VCL) network abstraction layer (NAL) unit has a gradual decoding refresh (GDR) network abstraction layer (NAL) unit type (GDR_NUT) to indicate that the VCL NAL unit contains a GDR picture. By using a GDR picture instead of IRAP picture, a smoother, more consistent bitrate may be achieved due to, for example, the size of a GDR picture relative to the size of an TRAP picture, which allows for reduced end to end delay (i.e., latency). Therefore, the coder/decoder (a.k.a., "codec") in video coding is improved relative to current codecs. As a practical matter, the improved video coding process offers the user a better user experience when videos are sent, received, and/or viewed.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
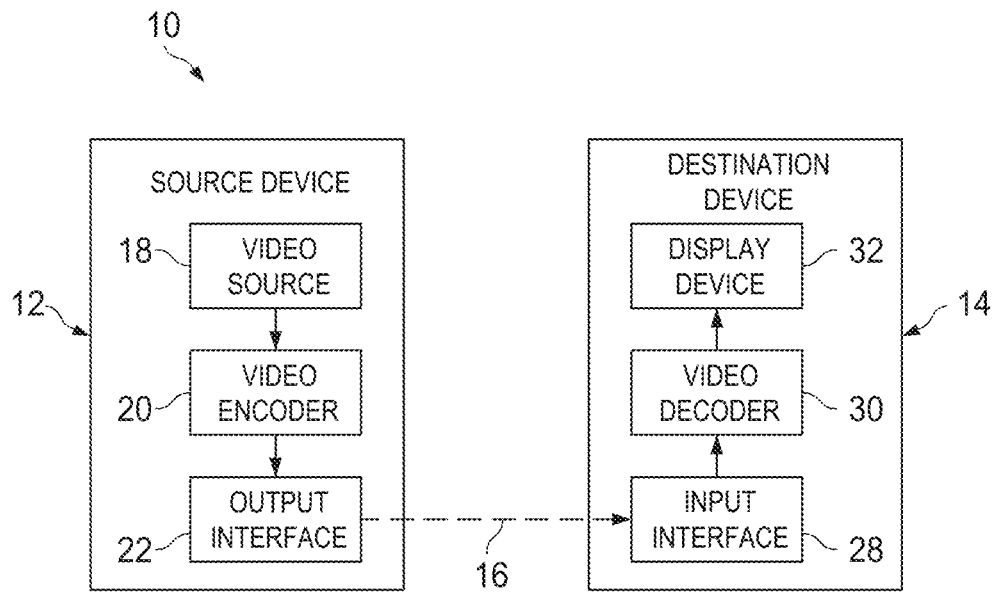
FIG. 1 is a block diagram illustrating an example coding system that may utilize GDR techniques.

FIG. 1 is a block diagram illustrating an example coding system 10 that may utilize video coding techniques as described herein. As shown in FIG. 1, the coding system 10 includes a source device 12 that provides encoded video data to be decoded at a later time by a destination device 14. In particular, the source device 12 may provide the video data to destination device 14 via a computer-readable medium 16. Source device 12 and destination device 14 may comprise any of a wide range of devices, including desktop computers, notebook (e.g., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, digital video disks (DVD)s, Compact Disc Read-Only Memories (CD-ROMs), flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), a file transfer protocol (FTP) server, network attached storage (NAS) devices, or a local disk drive. Destination device 14 may access the encoded video data through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, coding system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of the source device 12 and/or the video decoder 30 of the destination device 14 may be configured to apply the techniques for video coding. In other examples, a source device and a destination device may include other components or arrangements. For example, source device 12 may receive video data from an external video source, such as an external camera. Likewise, destination device 14 may interface with an external display device, rather than including an integrated display device.

The illustrated coding system 10 of FIG. 1 is merely one example. Techniques for video coding may be performed by any digital video encoding and/or decoding device. Although the techniques of this disclosure generally are performed by a video coding device, the techniques may also be performed by a video encoder/decoder, typically referred to as a "CODEC." Moreover, the techniques of this disclosure may also be performed by a video preprocessor. The video encoder and/or the decoder may be a graphics processing unit (GPU) or a similar device.

Source device 12 and destination device 14 are merely examples of such coding devices in which source device 12 generates coded video data for transmission to destination device 14. In some examples, source device 12 and destination device 14 may operate in a substantially symmetrical manner such that each of the source and destination devices 12, 14 includes video encoding and decoding components. Hence, coding system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video.

In some cases, when video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., group of pictures (GOPs). Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard presently under development, and may conform to the HEVC Test Model (HM). Alternatively, video encoder 20 and video decoder 30 may operate according to other proprietary or industry standards, such as the International Telecommunications Union Telecommunication Standardization Sector (ITU-T) H.264 standard, alternatively referred to as Moving Picture Expert Group (MPEG)-4, Part 10, Advanced Video Coding (AVC), H.265/HEVC, or extensions of such standards. The techniques of this disclosure, however, are not limited to any particular coding standard. Other examples of video coding standards include MPEG-2 and ITU-T H.263. Although not shown in FIG. 1, in some aspects, video encoder 20 and video decoder 30 may each be integrated with an audio encoder and decoder, and may include appropriate multiplexer-demultiplexer (MUX-DEMUX) units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device. A device including video encoder 20 and/or video decoder 30 may comprise an integrated circuit, a microprocessor, and/or a wireless communication device, such as a cellular telephone.

Figure 2:
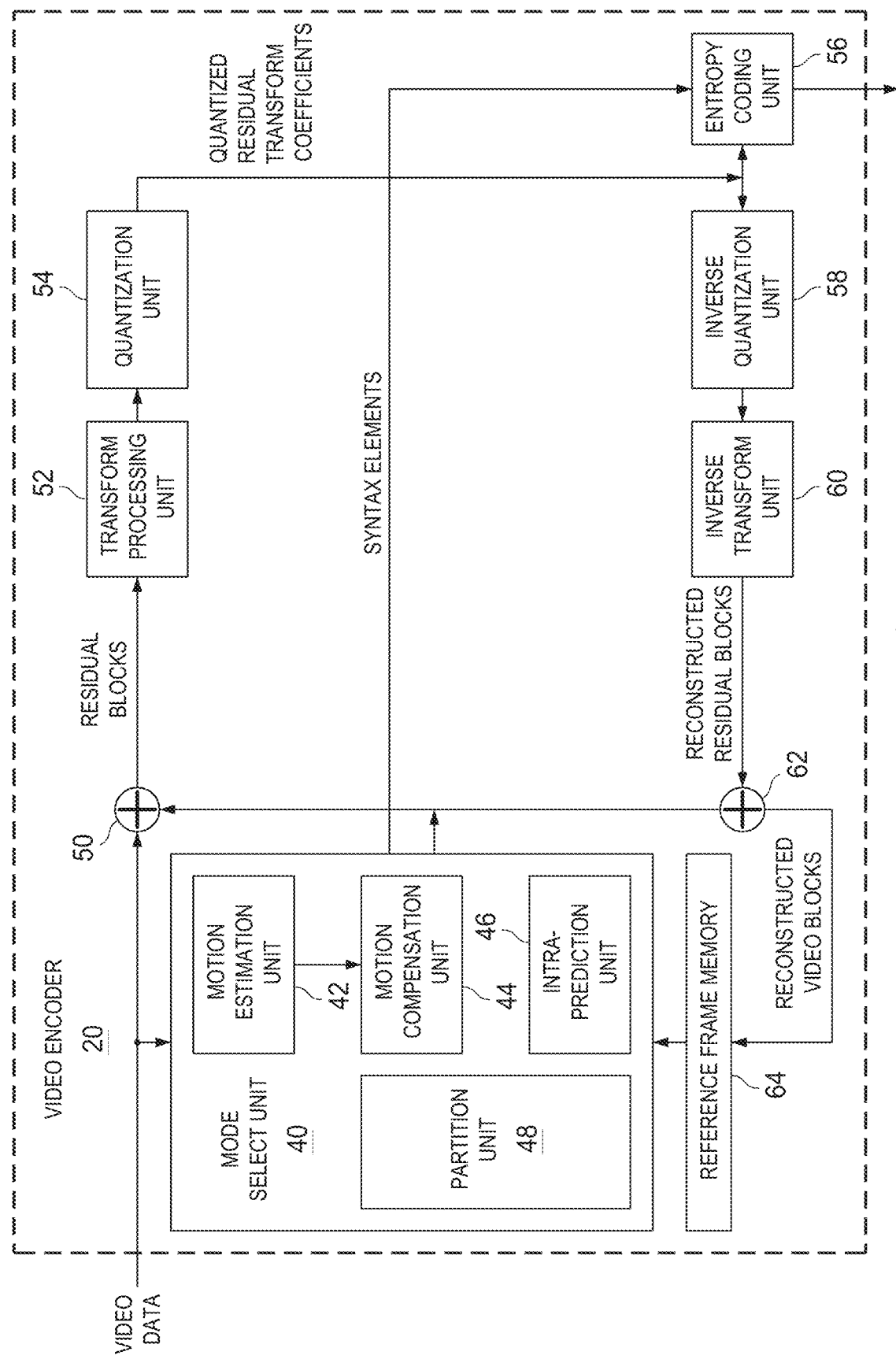
FIG. 2 is a block diagram illustrating an example video encoder that may implement GDR techniques.

FIG. 2 is a block diagram illustrating an example of video encoder 20 that may implement video coding techniques. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional (a.k.a., uni prediction) prediction (P mode) or bi-prediction (a.k.a., bi prediction) (B mode), may refer to any of several temporal-based coding modes.

As shown in FIG. 2, video encoder 20 receives a current video block within a video frame to be encoded. In the example of FIG. 2, video encoder 20 includes mode select unit 40, reference frame memory 64, summer 50, transform processing unit 52, quantization unit 54, and entropy coding unit 56. Mode select unit 40, in turn, includes motion compensation unit 44, motion estimation unit 42, intra-prediction (a.k.a., intra prediction) unit 46, and partition unit 48. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra-prediction unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into largest coding units (LCUs), and partition each of the LCUs into sub-coding units (sub-CUs) based on rate-distortion analysis (e.g., rate-distortion optimization). Mode select unit 40 may further produce a quad-tree data structure indicative of partitioning of a LCU into sub-CUs. Leaf-node CUs of the quad-tree may include one or more prediction units (PUs) and one or more transform units (TUs).

The present disclosure uses the term "block" to refer to any of a CU, PU, or TU, in the context of HEVC, or similar data structures in the context of other standards (e.g., macroblocks and sub-blocks thereof in H.264/AVC). A CU includes a coding node, PUs, and TUs associated with the coding node. A size of the CU corresponds to a size of the coding node and is square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction (a.k.a., inter prediction) mode encoded. PUs may be partitioned to be non-square in shape. Syntax data associated with a CU may also describe, for example, partitioning of the CU into one or more TUs according to a quad-tree. A TU can be square or non-square (e.g., rectangular) in shape.

Mode select unit 40 may select one of the coding modes, intra- or inter-, e.g., based on error results, and provides the resulting intra- or inter-coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy coding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference frame memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference frame memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

In addition, intra-prediction unit 46 may be configured to code depth blocks of a depth map using a depth modeling mode (DMM). Mode select unit 40 may determine whether an available DMM mode produces better coding results than an intra-prediction mode and the other DMM modes, e.g., using rate-distortion optimization (RDO). Data for a texture image corresponding to a depth map may be stored in reference frame memory 64. Motion estimation unit 42 and motion compensation unit 44 may also be configured to inter-predict depth blocks of a depth map.

After selecting an intra-prediction mode for a block (e.g., a conventional intra-prediction mode or one of the DMM modes), intra-prediction unit 46 may provide information indicative of the selected intra-prediction mode for the block to entropy coding unit 56. Entropy coding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation.

Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used.

Transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy coding unit 56 entropy codes the quantized transform coefficients. For example, entropy coding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy coding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference frame memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference frame memory 64. The reconstructed video block may be used by motion estimation unit 42 and motion compensation unit 44 as a reference block to inter-code a block in a subsequent video frame.

Figure 3:
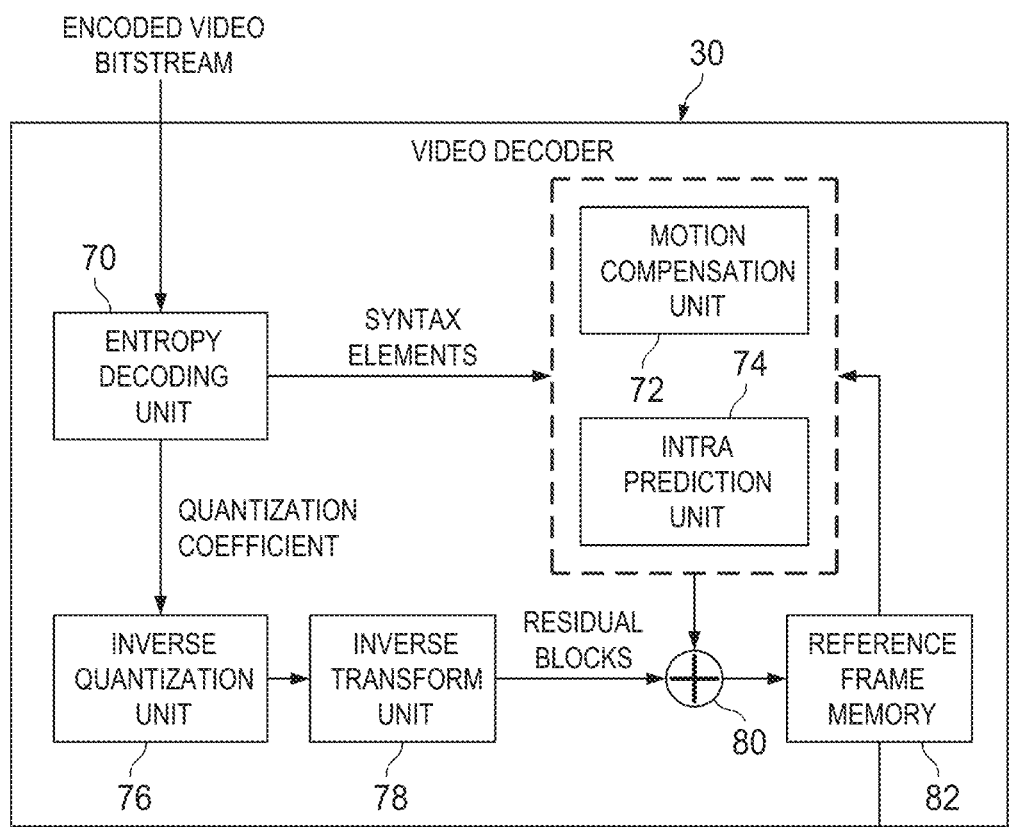
FIG. 3 is a block diagram illustrating an example of a video decoder that may implement GDR techniques.

FIG. 3 is a block diagram illustrating an example of video decoder 30 that may implement video coding techniques. In the example of FIG. 3, video decoder 30 includes an entropy decoding unit 70, motion compensation unit 72, intra-prediction unit 74, inverse quantization unit 76, inverse transformation unit 78, reference frame memory 82, and summer 80. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70, while intra-prediction unit 74 may generate prediction data based on intra-prediction mode indicators received from entropy decoding unit 70.

During the decoding process, video decoder 30 receives an encoded video bitstream that represents video blocks of an encoded video slice and associated syntax elements from video encoder 20. Entropy decoding unit 70 of the video decoder 30 entropy decodes the bitstream to generate quantized coefficients, motion vectors or intra-prediction mode indicators, and other syntax elements. Entropy decoding unit 70 forwards the motion vectors and other syntax elements to motion compensation unit 72. Video decoder 30 may receive the syntax elements at the video slice level and/or the video block level.

When the video slice is coded as an intra-coded (I) slice, intra-prediction unit 74 may generate prediction data for a video block of the current video slice based on a signaled intra-prediction mode and data from previously decoded blocks of the current frame or picture. When the video frame is coded as an inter-coded (e.g., B, P, or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference frame memory 82.

Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Data for a texture image corresponding to a depth map may be stored in reference frame memory 82. Motion compensation unit 72 may also be configured to inter-predict depth blocks of a depth map.

Keeping the above in mind, video compression techniques perform spatial (intra-picture) prediction and/or temporal (inter-picture) prediction to reduce or remove redundancy inherent in video sequences. For block-based video coding, a video slice (i.e., a video picture or a portion of a video picture) may be partitioned into video blocks, which may also be referred to as treeblocks, coding tree blocks (CTBs), coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

Image and video compression has experienced rapid growth, leading to various coding standards. Such video coding standards include ITU-T H.261, ISO/IEC MPEG-1 Part 2, ITU-T H.262 or ISO/IEC MPEG-2 Part 2, ITU-T H.263, ISO/IEC MPEG-4 Part 2, Advanced Video Coding (AVC), also known as ITU-T H.264 or ISO/IEC MPEG-4 Part 10, and High Efficiency Video Coding (HEVC), also known as ITU-T H.265 or MPEG-H Part 2. AVC includes extensions such as Scalable Video Coding (SVC), Multiview Video Coding (MVC) and Multiview Video Coding plus Depth (MVC+D), and 3D AVC (3D-AVC). HEVC includes extensions such as Scalable HEVC (SHVC), Multiview HEVC (MV-HEVC), and 3D HEVC (3D-HEVC).

There is also a new video coding standard, named Versatile Video Coding (VVC), being developed by the joint video experts team (JVET) of ITU-T and ISO/IEC. While the VVC standard has several working drafts, one Working Draft (WD) of VVC in particular, namely B. Bross, J. Chen, and S. Liu, "Versatile Video Coding (Draft 4)," JVET-M1001-v5, 13th JVET Meeting, January 2019 (VVC Draft 4) is referenced herein.

The description of the techniques disclosed herein are based on the under-development video coding standard Versatile Video Coding (VVC) by the joint video experts team (JVET) of ITU-T and ISO/IEC. However, the techniques also apply to other video codec specifications.

Figure 4:
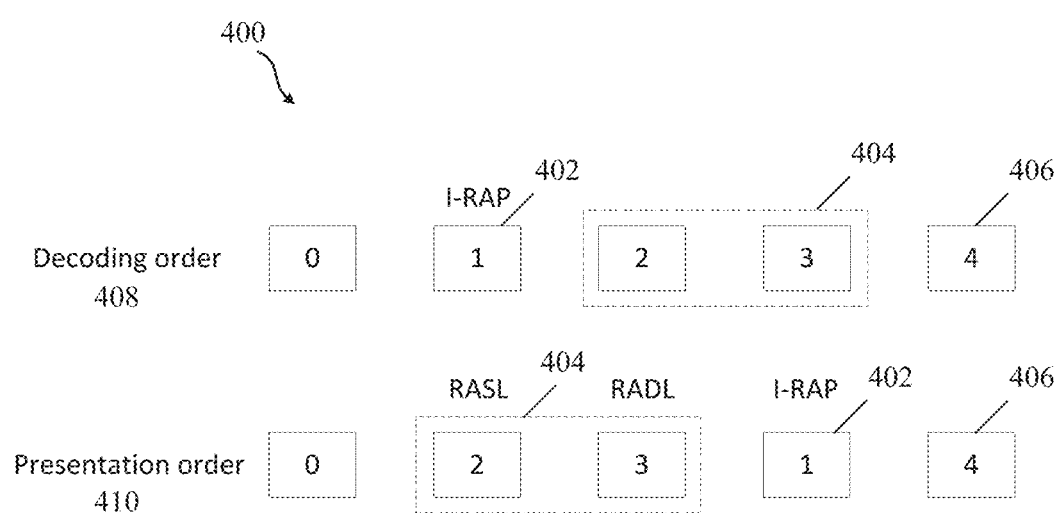
FIG. 4 is a representation of a relationship between an intra random access point (IRAP) picture relative to leading pictures and trailing pictures in a decoding order and a presentation order.

FIG. 4 is a representation 400 of a relationship between an IRAP picture 402 relative to leading pictures 404 and trailing pictures 406 in a decoding order 408 and a presentation order 410. In an embodiment, the IRAP picture 402 is referred to as a clean random access (CRA) picture or as an instantaneous decoder refresh (IDR) picture with random access decodable leading (RADL) picture. In HEVC, IDR pictures, CRA pictures, and Broken Link Access (BLA) pictures are all considered IRAP pictures 402. For VVC, during the 12th JVET meeting in October 2018, it was agreed to have both IDR and CRA pictures as IRAP pictures.

As shown in FIG. 4, the leading pictures 404 (e.g., pictures 2 and 3) follow the IRAP picture 402 in the decoding order 408, but precede the IRAP picture 402 in the presentation order 410. The trailing picture 406 follows the IRAP picture 402 in both the decoding order 408 and in the presentation order 410. While two leading pictures 404 and one trailing picture 406 are depicted in FIG. 4, those skilled in the art will appreciate that more or fewer leading pictures 404 and/or trailing pictures 406 may be present in the decoding order 408 and the presentation order 410 in practical applications.

The leading pictures 404 in FIG. 4 have been divided into two types, namely random access skipped lading (RASL) and RADL. When decoding starts with the IRAP picture 402 (e.g., picture 1), the RADL picture (e.g., picture 3) can be properly decoded; however, the RASL picture (e.g., picture 2) cannot be properly decoded. Thus, the RASL picture is discarded. In light of the distinction between RADL and RASL pictures, the type of leading picture associated with the IRAP picture should be identified as either RADL or RASL for efficient and proper coding. In HEVC, when RASL and RADL pictures are present, it is constrained that for RASL and RADL pictures that are associated with the same IRAP picture, the RASL pictures shall precede the RADL pictures in presentation order 410.

An IRAP picture 402 provides the following two important functionalities/benefits. Firstly, the presence of an IRAP picture 402 indicates that the decoding process can start from that picture. This functionality allows a random access feature in which the decoding process starts at that position in the bitstream, not necessarily the beginning of the bitstream, as long as an IRAP picture 402 is present at that position. Secondly, the presence of an IRAP picture 402 refreshes the decoding process such that a coded picture starting at the IRAP picture 402, excluding RASL pictures, are coded without any reference to previous pictures. Having an IRAP picture 402 present in the bitstream consequently would stop any error that may happen during decoding of coded pictures prior to the IRAP picture 402 to propagate to the IRAP picture 402 and those pictures that follow the IRAP picture 402 in decoding order 408.

While IRAP pictures 402 provide important functionalities, they come with a penalty to the compression efficiency. The presence of an IRAP picture 402 causes a surge in bitrate. This penalty to the compression efficiency is due to two reasons. Firstly, as an IRAP picture 402 is an intra-predicted picture, the picture itself would require relatively more bits to represent when compared to other pictures (e.g., leading pictures 404, trailing pictures 406) that are inter-predicted pictures. Secondly, because the presence of an IRAP picture 402 breaks temporal prediction (this is because the decoder would refresh decoding process, in which one of the action of the decoding process for this is to remove previous reference pictures in the decoded picture buffer (DPB)), the IRAP picture 402 causes the coding of pictures that follow the IRAP picture 402 in decoding order 408 to be less efficient (i.e., needs more bits to represent) because they have less reference pictures for their inter-prediction coding.

Among the picture types that are considered IRAP pictures 402, the IDR picture in HEVC has different signaling and derivation when compared to other picture types. Some of the differences are as follows.

For signaling and derivation of a picture order count (POC) value of an IDR picture, the most significant bit (MSB) part of the POC is not derived from previous key picture but simply set to be equal to 0.

For signaling information needed for reference picture management, the slice header of an IDR picture does not contain information needed to be signaled to assist reference picture management. For other picture types (i.e., CRA, Trailing, temporal sub-layer access (TSA), etc.), information such as the reference picture set (RPS) described below or other forms of similar information (e.g., reference picture lists) are needed for the reference pictures marking process (i.e., the process to determine the status of reference pictures in the decoded picture buffer (DPB), either used for reference and unused for reference). However, for the IDR picture, such information does not need to be signaled because the presence of IDR indicates that the decoding process shall simply mark all reference pictures in the DPB as unused for reference.

In HEVC and VVC, IRAP pictures 402 and leading pictures 404 may each be contained within a single network abstraction layer (NAL) unit. A set of the NAL units may be referred to as an access unit. IRAP pictures 402 and leading pictures 404 are given different NAL unit types so that they can be easily identified by system level applications. For example, a video splicer needs to understand coded picture types without having to understand too much detail of the syntax element in the coded bitstream, particularly to identify IRAP pictures 402 from non-IRAP pictures and to identify leading pictures 404, including determining RASL and RADL pictures, from trailing pictures 406. Trailing pictures 406 are those pictures that are associated with an IRAP picture 402 and follow the IRAP picture 402 in presentation order 410. A picture may follow the particular IRAP picture 402 in decoding order 408 and precede any other IRAP picture 402 in decoding order 408. For this, giving IRAP pictures 402 and leading pictures 404 their own NAL unit type helps such applications.

For HEVC, NAL unit types for IRAP pictures include the following:
BLA with leading picture (BLA_W_LP): NAL unit of a Broken Link Access (BLA) picture that may be followed by one or more leading pictures in decoding order.
BLA with RADL (BLA_W_RADL): NAL unit of a BLA picture that may be followed by one or more RADL pictures but no RASL picture in decoding order.
BLA with no leading picture (BLA_N_LP): NAL unit of a BLA picture that is not followed by leading picture in decoding order.
IDR with RADL (IDR_W_RADL): NAL unit of an IDR picture that may be followed by one or more RADL pictures but no RASL picture in decoding order.
IDR with no leading picture (IDR_N_LP): NAL unit of an IDR picture that is not followed by leading picture in decoding order.
CRA: NAL unit of a Clean Random Access (CRA) picture that may be followed by leading pictures (i.e., either RASL pictures or RADL pictures or both).
RADL: NAL unit of a RADL picture.
RASL: NAL unit of a RASL picture.

For VVC, the NAL unit type for IRAP pictures 402 and leading pictures 404 are as follows:
IDR with RADL (IDR_W_RADL): NAL unit of an IDR picture that may be followed by one or more RADL pictures but no RASL picture in decoding order.
IDR with no leading picture (IDR_N_LP): NAL unit of an IDR picture that is not followed by leading picture in decoding order.
CRA: NAL unit of a Clean Random Access (CRA) picture that may be followed by leading pictures (i.e., either RASL pictures or RADL pictures or both).
RADL: NAL unit of a RADL picture.
RASL: NAL unit of a RASL picture.

Progressive Intra Refresh/Gradual Decoding Refresh are discussed below.

For low delay applications, it is desirable to avoid coding a picture as an IRAP picture (e.g., IRAP picture 402) due to its relatively large bitrate requirement compared to non-IRAP (i.e., P-/B-) pictures, which consequently cause more latency/delays. However, totally avoiding the use of IRAP may not be possible in all low delay applications. For example, for conversational applications such as multi-party teleconferencing it is necessary to provide regular points in which a new user can join the teleconferencing.

To provide access to a bitstream that allows a new user to join a multi-party teleconferencing application, one possible strategy is to use a progressive intra refresh technique (PIR) instead of using IRAP pictures to avoid having a peak in bitrate. PIR may also be referred to as gradual decoding refresh (GDR). The term PIR and GDR may be used interchangeably in the present disclosure.

Figure 5:
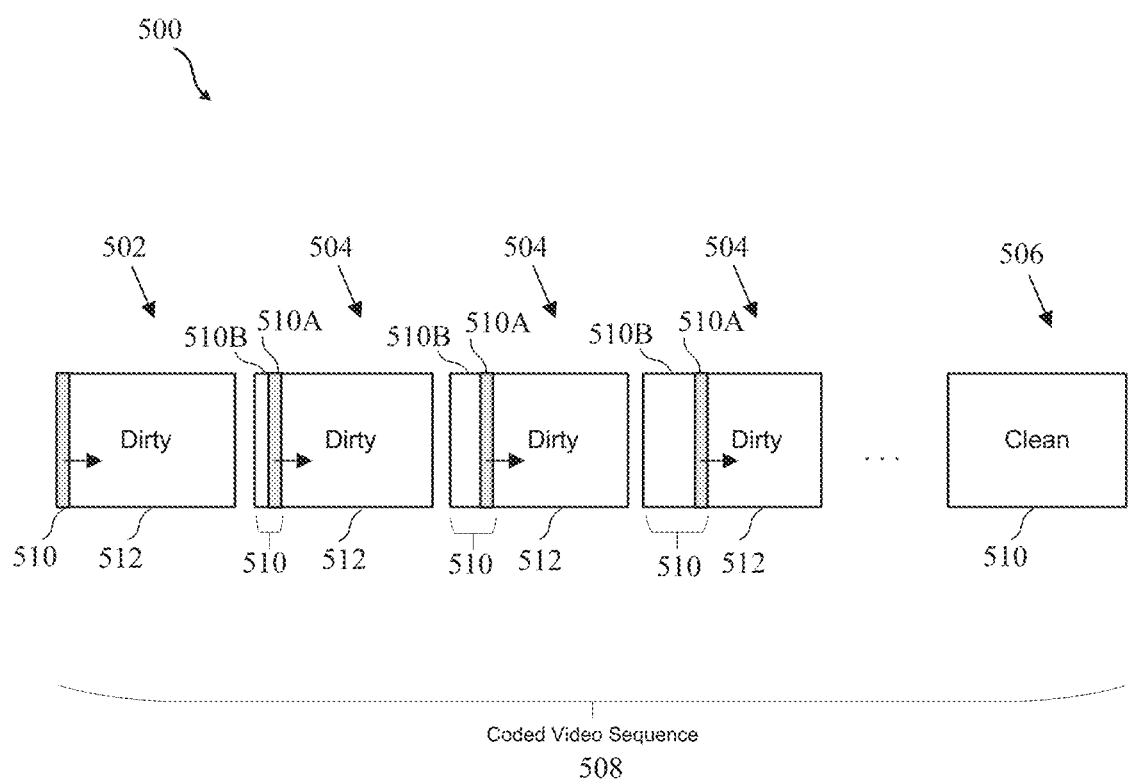
FIG. 5 illustrates a gradual decoding refresh technique.

FIG. 5 illustrates a gradual decoding refresh (GDR) technique 500. As shown, the GDR technique 500 is depicted using a GDR picture 502, one or more trailing pictures 504, and a recovery point picture 506 within a coded video sequence 508 of a bisteam. In an embodiment, the GDR picture 502, the trailing pictures 504, and the recovery point picture 506 may define a GDR period in the CVS 508. The CVS 508 is a series of pictures (or portions thereof) starting with the GDR picture 502 and includes all pictures (or portions thereof) up to, but not including, the next GDR picture or until the end of the bitstream. The GDR period is a series of pictures starting with the GDR picture 502 and includes all pictures up to and including the recovery point picture 506.

As shown in FIG. 5, the GDR technique 500 or principle works over a series of pictures starting with the GDR picture 502 and ending with the recovery point picture 506. The GDR picture 502 contains a refreshed/clean region 510 containing blocks that have all be coded using intra prediction (i.e., intra-predicted blocks) and an un-refreshed/dirty region 512 containing blocks that have all be coded using inter prediction (i.e., inter-predicted blocks).

The trailing picture 504 immediately adjacent to the GDR picture 502 contains a refreshed/clean region 510 having a first portion 510A coded using intra prediction and a second portion 510B coded using inter prediction. The second portion 510B is coded by referencing the refreshed/clean region 510 of, for example, a preceeding picture within the GDR period of the CVS 508. As shown, the refreshed/clean region 510 of the trailing pictures 504 expands as the coding process moves or progresses in a consistent direction (e.g., from left to right), which correspondingly shrinks the un-refreshed/dirty region 512. Eventually, the recovery point picture 506, which contains only the refreshed/clean region 510, is obtained from the coding process. Notably, and as will be further discussed below, the second portion 510B of the refreshed/clean region 510, which is coded as inter-predicted blocks, may only refer to the refreshed region/clean region 510 in the reference picture.

In HEVC, the GDR technique 500 of FIG. 5 was supported non-normatively using a recovery point Supplemental Enhancement Information (SEI) message and a region refresh information SEI message. These two SEI messages do not define how GDR is performed. Rather, the two SEI messages simply provide a mechanism to indicate the first and the last pictures in the GDR period (i.e., provided by the recovery point SEI message) and the region that is refreshed (i.e., provided by the region refresh information SEI message).

In practice, the GDR technique 500 is performed by using two techniques together. Those two techniques are constraint intra prediction (CIP) and encoder constraints for motion vectors. CIP can be used for GDR purposes, particularly to code the region which is coded only as intra-predicted blocks (e.g., the first portion 510A of the refreshed/clean region 510) because CIP allows the region not using samples from the un-refreshed region (e.g., the un-refreshed/dirty region 512) to be used for reference. However, the use of CIP causes severe coding performance degradation because the constraint to intra blocks must be applied not only for intra blocks in the refreshed region, but also to all intra blocks in the picture. Encoder constraints for motion vectors restrict the encoder from using any samples in the reference pictures that are located outside refreshed region. Such a constraint causes non-optimal motion search.

Figure 6:
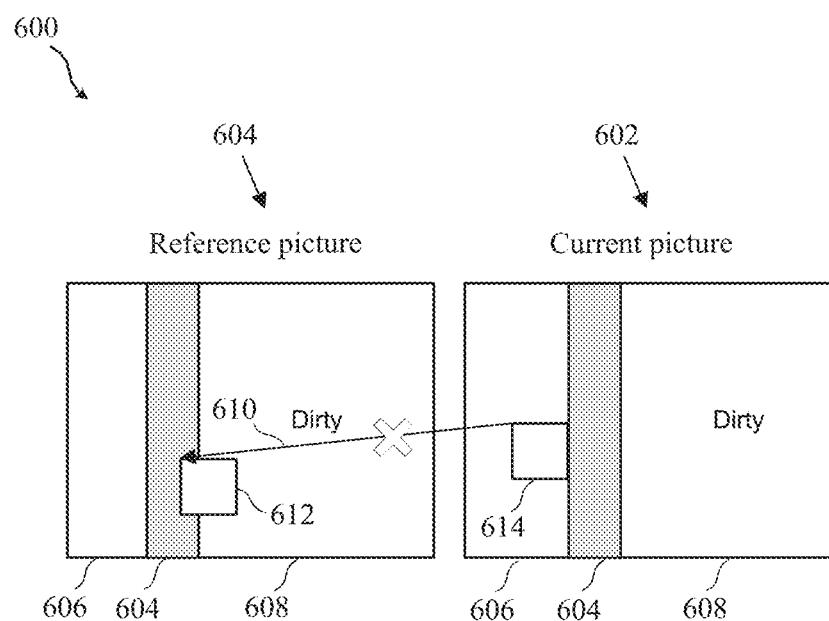
FIG. 6 is a schematic diagram illustrating an undesirable motion search.

FIG. 6 is a schematic diagram illustrating an undesirable motion search 600 when using the encoder restriction to support GDR. As shown, the motion search 600 depicts a current picture 602 and a reference picture 604. The current picture 602 and the reference picture 604 each include a refreshed region 606 coded with intra prediction, a refreshed region 608 coded with inter prediction, and an unrefreshed region 608. The refreshed region 604, the refreshed region 606, and the unrefreshed region 608 are silimiar to the the first portion 510A of the refreshed/clean region 510, the second portion 510B of the refreshed/clean region 510, and the un-refreshed/dirty region 512 in FIG. 5.

During motion search process, the encoder is constrained or prevented from selecting any motion vector 610 that results in some of the samples of the reference block 612 being located outside the refreshed region 606. This occurs even when the reference block 612 provides the best rate-distortion cost criteria when predicting the current block 614 in the current picture 602. Thus, FIG. 6 illustrates the reason for non-optimality in the motion search 600 when using the encoder restriction for supporting GDR.

The JVET contributions JVET-K0212 and JVET-L0160 describe the implementation of GDR based on the use of CIP and the encoder constraints approach. The implementation can be summarized as follows: intra prediction mode is forced on a coding unit on a column basis, constrained intra prediction is enabled to ensure reconstruction of intra CU, motion vectors are constrained to point within the refreshed area while taking into account an additional margin to avoid error spreading for filters (6 pixels for instance), and removing former reference pictures when re-looping the intra column.

The JVET contribution JVET-M0529 proposed a method for indicating that a picture is the first and the last in the GDR period normatively. The proposed idea works as follows.

Define a new NAL unit with a NAL unit type recovery point indication as a non-video coding layer (VCL) NAL unit. The payload of the NAL unit contains a syntax element to specify information that can be used to derive the POC value of the last picture in the GDR period. The access unit that contains the non-VCL NAL unit with the type recovery point indication is called a recovery point begin (RBP) access unit (AU) and the picture in the RBP access unit is called an RBP picture. The decoding process can start from RBP AU. When decoding starts from RBP AU, all pictures in the GDR period, except the last picture, are not output.

Some of the problems with the existing GDR design are discussed.

The existing designs/approaches for supporting GDR have at least the following problems.

The method for normatively defining GDR in NET-M0529 has the following problems. The proposed method does not describe how GDR is performed. Instead, the proposed method only provides some signaling for indicating the first and the last pictures in the GDR period. For indicating the first and the last pictures in the GDR period, a new non-VCL NAL unit is needed. This is a redundancy as the information contained in the recovery point indication (RPI) NAL unit can simply be included in the tile group header of the first picture in the GDR period. Also, the proposed method is not able to describe which region in the pictures in the GDR period are the refreshed region and un-refreshed region.

The GDR approach described in JVET-K0212 and JVET-L0160 has the following problems. First, the use of CIP. It is necessary to code a refreshed region with intra-prediction with some constraints to prevent any samples from the unrefreshed region being used for spatial reference. When CIP is used, the coding is picture based, which means that all intra blocks in the picture must also be coded as CIP intra blocks. This consequently causes performance degradation. Further, the use of an encoder constraint to limit motion search prevents the encoder from choosing the best motion vector when samples of the reference block associated with the motion vector are not completely within the refreshed region in the reference picture. Also, the refreshed region that is coded only with intra-prediction is not CTU size. Instead, the refreshed region can go smaller than CTU size, down to minimum CU size. This makes the implementation unnecessarily complicated as it may need an indication at the block level.

Disclosed herein are techniques for supporting gradual decoding refresh (GDR) in video coding. The disclosed techniques allow progressive intra refresh to enable random access without having to use an intra random access point (IRAP) picture. As will be more fully explained below, a video coding layer (VCL) network abstraction layer (NAL) unit has a gradual decoding refresh (GDR) network abstraction layer (NAL) unit type (GDR_NUT) to indicate that the VCL NAL unit contains a GDR picture. That is, the GDR_NUT immediately indicates to the video decoder that the VCL NAL unit having the GDR_NUT contains the GDR picture. By using a GDR picture instead of IRAP picture, a smoother, more consistent bitrate may be achieved due to, for example, the size of a GDR picture relative to the size of an IRAP picture, which allows for reduced end to end delay (i.e., latency). Therefore, the coder/decoder (a.k.a., "codec") in video coding is improved relative to current codecs. As a practical matter, the improved video coding process offers the user a better user experience when videos are sent, received, and/or viewed.

In order to solve one or more of the problems discussed above, the present disclosure discloses the following aspects. Each of the aspects can be applied individually, and some of them can be applied in combination.

1) A VCL NAL unit with type GDR_NUT is defined.
  a. Pictures with the NAL unit type GDR_NUT are referred to as a GDR picture, that is, the first picture in the GDR period.
  b. A GDR picture has a temporalID equal to 0.
  c. An access unit that contains a GDR picture is referred to as a GDR access unit. As noted above, an access unit is a set of NAL units. Each NAL unit may contain a single picture.

2) A coded video sequence (CVS) may start with a GDR access unit.

3) A GDR access unit is the first access unit in the CVS when one of the following is true:
  a. The GDR access unit is the first access unit in the bitstream.
  b. The GDR access unit immediately follows an end-of-sequence (EOS) access unit.
  c. The GDR access unit immediately follows an end-of-bitstream (EOB) access unit.
  d. A decoder flag so called NoIncorrectPicOutputFlag is associated with the GDR picture and the value of the flag is set to equal to 1 (i.e., true) by an entity outside the decoder.

4) When a GDR picture is the first access unit in the CVS, the following apply:
  a. All the reference pictures in the DPB are marked as "unused for reference."
  b. The POC MSB of the picture is set to be equal to 0.
  c. The GDR picture and all the pictures that follow the GDR picture in output order until the last picture in the GDR period, excluding the last picture in the GDR period, are not to be output (i.e., marked as "not needed for output").

5) A flag to specify whether GDR is enabled is signaled in a sequence level parameter set (e.g., in the SPS).
  a. The flag may be designated gdr_enabled_flag.
  b. When the flag is equal to 1, the GDR picture may be present in the CVS. Otherwise, when the flag is equal to 0, GDR is not enabled so that the GDR picture is not present in the CVS.

6) Information that can be used to derive the POC value of the last picture in the GDR period is signaled in tile group header of GDR picture.
  a. The information is signaled as a delta POC between the last picture in the GDR period and the GDR picture. The information can be signaled using a syntax element designated recovery_point_cnt.
  b. The presence of the syntax element recovery_point_cnt in a tile group header may be conditioned upon the value of a gdr_enabled_flag and the NAL unit type of a picture, i.e., the flag is present only when the gdr_enabled_flag is equal to 1 and the nal_unit_type of the NAL unit containing the tile group is GDR_NUT.

7) A flag to specify whether a tile group is part of a refreshed region or not is signaled in tile group header.
  a. The flag may be designated refreshed_region_flag.
  b. The presence of the flag may be conditioned upon the value of the gdr_enabled_flag and whether the picture containing the tile group is within a GDR period. Thus, the flag is present only when all of the following are true:
    i. The value of gdr_enabled_flag is equal to 1.
    ii. The POC of the current picture is equal to or greater than the POC value of the last GDR picture (when the current picture is the GDR picture, the last GDR picture is the current picture) and is less than the POC of the last picture in the GDR period.
  c. When the flag is not present in the tile group header, the value of the flag is inferred to be equal to 1.

8) All tile groups having a refreshed_region_flag equal to 1 cover a connected region. Likewise, all tile groups having the refreshed_region_flag equal to 0 cover the connected region as well.

9) A tile group with a refreshed_region_flag can be of type I (i.e., intra tile group) or B- or P- (i.e., inter tile group).

10) Each picture starting from the GDR picture to the last picture in the GDR period contains at least one tile group with a refreshed_region_flag equal to 1.

11) A GDR picture contains at least one tile group with a refreshed_region_flag equal to 1 and a tile_group_type equal to I (i.e., intra tile group).

12) When the gdr_enabled_flag is equal to 1, information of rectangular tile group, i.e., the number of tile groups and their addresses, is allowed to be signaled in either the picture parameter set (PPS) or in tile group header. To do this, a flag is signaled in the PPS to specify whether rectangular tile group information is present in the PPS or not. This flag may be called rect_tile_group_info_in_pps_flag. This flag may be constrained to be equal to 1 when the gdr_enabled_flag is equal to 1.
  a. In one alternative, instead of signaling whether rectangular tile group information is present in the PPS or not, a more general flag can be signaled in the PPS to specify whether tile group information (i.e., any types of tile group—such as rectangular tile group, raster-scan tile group) is present in the PPS.

13) When tile group information is not present in the PPS, it may be further constrained that the signaling of explicit tile group identifier (ID) information is not present. Explicit tile group ID information includes: signaled_tile_group_id_flag, signaled_tile_group_id_length_minus1, and tile_group_id[i].

14) A flag is signaled to specify whether a loop filtering operation across the boundaries between the refreshed region and un-refreshed region in a picture is allowed.
  a. This flag may be signaled in the PPS and called loop_filter_across_refreshed_region_enabled_flag.

b. The presence of a loop_filter_across_refreshed_region_enabled_flag may be conditioned upon the value of a loop_filter_across_tile_enabled_flag. When the loop_filter_across_tile_enabled_flag is equal to 0, the loop_filter_across_refreshed_region_enabled_flag may not be present and its value is inferred to be equal to 0.

c. In one alternative, the flag may be signaled in the tile group header and its presence may be condition upon the value of refreshed_region_flag, i.e., the flag is present only when the value of refreshed_region_flag is equal to 1.

15) When it is indicated that a tile group is a refreshed region and it is indicated that loop filter across refreshed region is not allowed, the following apply:

a. Deblocking of the edge at the border of the tile group is not performed when the neighbor tile group that shares the edge is an un-refreshed tile group.

b. Sample adaptive offset (SAO) process for blocks at the boundary of the tile group does not use any samples from outside the refreshed region boundary.

c. Adaptive loop filtering (ALF) process for blocks at the boundary of the tile group does not use any samples from outside the refreshed region boundary.

16) When the gdr_enabled_flag is equal to 1, each picture is associated with variables to determine the boundaries of the refreshed region in the picture. These variables may be called:

a. PicRefreshedLeftBoundaryPos for the left boundary position of the refreshed region in the picture.

b. PicRefreshedRightBoundaryPos for the right boundary position of the refreshed region in the picture.

c. PicRefreshedTopBoundaryPos for the top boundary position of the refreshed region in the picture.

d. PicRefreshedBotBoundaryPos for the bottom boundary position of the refreshed region in the picture.

17) The boundaries of a refreshed region in a picture may be derived. The boundaries of the refreshed region of the picture are updated by the decoder after a tile group header is parsed and the value of refreshed_region_flag of the tile group is equal to 1.

18) In one alternative to solution 17), the boundaries of the refreshed region in the picture are signaled explicitly in each tile group of the picture.

a. A flag may be signaled to indicate whether the picture that the tile group belongs to contains an un-refreshed region. When it is specified that the picture does not contain the un-refreshed region, no refreshed boundaries information is signaled and can simply be inferred to be equal to the picture boundaries.

19) For the current picture, the boundaries of the refreshed region are used in an in-loop filters process as follows:

a. For the deblocking process, to determine the edge of the refreshed region for deciding whether the edge needs to be deblocked or not.

b. For the SAO process, to determine the border of the refresh region so that the clipping process can be applied to avoid using samples from the un-refreshed region when loop filter across the refreshed region is not allowed.

c. For the ALF process, to determine the border of the refresh region so that the clipping process can be applied to avoid using samples from un-refreshed region when loop filter across refreshed region is not allowed.

20) For the motion compensation process, the information about boundaries of the refreshed region, particularly the boundaries of the refreshed region in the reference picture, is used as follows: when the current block in the current picture is in the tile group with a refreshed_region_flag equal to 1 and the reference block is in a reference picture that contains an un-refreshed region, the following apply:

a. The motion vector from the current block to that reference picture is clipped by the boundaries of the refreshed region in that reference picture.

b. For a fractional interpolation filter for samples in that reference picture, it is clipped by the boundaries of the refreshed region in that reference picture.

A detailed description of embodiments of the present disclosure is provided. The description is relative to the basis text, which is the JVET contribution JVET-M1001-v5. That is, only the delta is described, while the texts in the basis text that are not mentioned below apply as they are. Modified text relative to the basis text is italicized.

Definitions are provided.

3.1 clean random access (CRA) picture: An IRAP picture for which each VCL NAL unit has nal_unit_type equal to CRA NUT.

NOTE—A CRA picture does not refer to any pictures other than itself for inter prediction in its decoding process, and may be the first picture in the bitstream in decoding order, or may appear later in the bitstream. A CRA picture may have associated RADL or RASL pictures. When a CRA picture has a NoIncorrectPicOutputFlag equal to 1, the associated RASL pictures are not output by the decoder, because the RASL pictures may not be decodable, as they may contain references to pictures that are not present in the bitstream.

3.2 coded video sequence (CVS): A sequence of access units that comprises, in decoding order, of an IRAP access unit with NoIncorrectPicOutputFlag equal to 1 or a GDR access unit with NoIncorrectPicOutputFlag equal to 1, followed by zero or more access units that are not IRAP access units with NoIncorrectPicOutputFlag equal to 1 or GDR access unit with NoIncorrectPicOutputFlag equal to 1, including all subsequent access units up to but not including any subsequent access unit that is an IRAP access unit with NoIncorrectPicOutputFlag equal to 1 or GDR access unit with NoIncorrectPicOutputFlag equal to 1.

NOTE 1—An IRAP access unit may be an IDR access unit or a CRA access unit. The value of NoIncorrectPicOutputFlag is equal to 1 for each DR access unit and each CRA access unit that is the first access unit in the bitstream in decoding order, is the first access unit that follows an end of sequence NAL unit in decoding order, or has HandleCraAsCvsStartFlag equal to 1.

NOTE 2—The value of NoIncorrectPicOutputFlag is equal to 1 for each GDR access unit that is the first access unit in the bitstream in decoding order, is the first access unit that follows an end of sequence NAL unit in decoding order, or has HandleGdrAsCvsStartFlag equal to 1.

3.3 gradual decoding refresh (GDR) access unit: An access unit in which the coded picture is a GDR picture.

3.4 gradual decoding refresh (GDR) picture: A picture for which each VCL NAL unit has nal_unit_type equal to GDR_NUT 3.5 random access skipped leading (RASL) picture: A coded picture for which each VCL NAL unit has nal_unit_type equal to RASL NUT.

NOTE—All RASL pictures are leading pictures of an associated CRA picture. When the associated CRA picture has NoIncorrectPicOutputFlag equal to 1, the RASL picture is not output and may not be correctly decodable, as the RASL picture may contain references to pictures that are not present in the bitstream. RASL pictures are not used as reference pictures for the decoding process of non-RASL pictures. When present, all RASL pictures precede, in decoding order, all trailing pictures of the same associated CRA picture.

Sequence parameter set raw byte sequence payload (RBSP) syntax and semantics.

|  | Descriptor |
|---|---|
| seq_parameter_set_rbsp( ) { |  |
| ... |  |
| gdr_enabled_flag | *u(1)* |
| ... |  | gdr_enabled_flag equal to 1 specifies GDR pictures may be present in the coded video sequence. gdr_enabled_flag equal to 0 specifies that GDR pictures are not present in the coded video sequence.

Picture parameter set RB SP syntax and semantics.

|  | Descriptor |
|---|---|
| pic_parameter_set_rbsp( ) { |  |
| ... |  |
| single_tile_in_pic_flag | u(1) |
| if( !single_tile_in_pic_flag ) { |  |
| ... | ue(v) |
| single_tile_per_tile_group_flag | u(1) |
| if( !single_tile_per_tile_group_flag ) |  |
| rect_tile_group_flag | u(1) |
| if( rect_tile_group_flag ) |  |
| *rect_tile_group_info_in_pps_flag* | *u(1)* |
| if( rect_tile_group_flag && |  |
| !single_tile_per_tile_group_flag && |  |
| rect_tile_group_info_in_pps_flag ) { |  |
| num_tile_groups_in_pic_minus1 | ue(v) |
| for( i = 0; i <= num_tile_groups_in_pic_minus1; i++ ) { |  |
| if( i > 0 ) |  |
| top_left_tile_idx[ i ] | u(v) |
| bottom_right_tile_idx[ i ] | u(v) |
| } |  |
| } |  |
| loop_filter_across_tiles_enabled_flag | u(1) |
| if( loop_filter_across_tiles_enabled_flag ) |  |
| loop_filter_across_tile_groups_enabled_flag | u(1) |
| *if( loop_filter_across_tile_groups_enabled_flag )* |  |
| *loop_filter_across_refreshed_region_enabled_flag* | *u(1)* |
| } |  |
| ... |  | rect_tile_group_info_in_pps_flag equal to 1 specifies that the rectangular tile group information is signalled in the PPS. rect_tile_group_info_in_pps_flag equal to 0 specifies that the rectangular tile group information is not signalled in the PPS.

It is a requirement of bitstream conformance that the value of rect_tile_group_info_in_pps_flag shall be equal to 0 when the value of gdr_enabled_flag in the active SPS is equal to 0.

loop_filter_across_refreshed_region_enabled_flag equal to 1 specifies that in-loop filtering operations may be performed across boundaries of tile group with refreshed_region_flag equal to 1 in pictures referring to the PPS. loop_filter_across_refreshed_region_enabled_flag equal to 0 specifies that in-loop filtering operations are not performed across boundaries of tile group with refreshed_region_flag equal to 1 in pictures referring to the PPS. The in-loop filtering operations include the deblocking filter, sample adaptive offset filter, and adaptive loop filter operations. When not present, the value of loop_filter_across_refreshed_region_enabled_flag is inferred to be equal to 0.

signalled_tile_group_id_flag equal to 1 specifies that the tile group ID for each tile group is signalled. signalled_tile_group_index_flag equal to 0 specifies that tile group IDs are not signalled. When not present, the value of signalled_tile_group_index_flag is inferred to be equal to 0.

signalled_tile_group_id_length_minus1 plus 1 specifies the number of bits used to represent the syntax element tile_group_id[i] when present, and the syntax element tile_group_address in tile group headers. The value of signalled_tile_group_index_length_minus1 shall be in the range of 0 to 15, inclusive. When not present, the value of signalled_tile_group_index_length_minus1 is inferred as follows:

If rect_tile_group_info_in_pps_flag is equal to 1, Ceil (Log 2(num_tile_groups_in_pic_minus1+1))−1.

Otherwise, Ceil(Log 2(NumTilesInPic))−1

General tile group header syntax and semantics.

|  | Descriptor |
|---|---|
| tile_group_header( ) { |  |
| ... |  |
| if( rect_tile_group_flag || NumTilesInPic > 1 ) |  |
| tile_group_address | u(v) |
| if( *!rect_tile_group_info_in_pps_flag* && |  |
| !single_tile_per_tile_group_flag ) { |  |
| *if( rect_tile_group_flag )* |  |
| *bottom_right_tile_id* | *u(v)* |
| else |  |
| num_tiles_in_tile_group_minus1 | ue(v) |
| } |  |
| tile_group_type | ue(v) |
| tile_group_pic_order_cnt_lsb | u(v) |
| *if( gdr_enabled_flag ) {* |  |
| *if( nal_unit_type = = GDR_NUT )* |  |
| *recovery_poc_cnt* | *se(v)* |
| *if( PicOrderCntVal >= LastGDRPocVal &&* |  |
| *PicOrderCntVal < RecoveryPointPocVal )* |  |
| *refreshed_region_flag* | *u(1)* |
| *}* |  |
| ... | ) | tile_group_address specifies the tile address of the first tile in the tile group. When not present, the value of tile_group_address is inferred to be equal to 0.

If rect_tile_group_flag is equal to 0, the following applies:

The tile_group_address is the tile ID as specified by Equation 6-7.

The length of tile_group_address is Ceil(Log 2(NumTilesInPic))bits.

The value of tile_group_address shall be in the range of 0 to NumTilesInPic−1, inclusive.

Else if rect_tile_group_flag is equal to 1 and rect_tile_group_info_in_pps is equal to 0, the following applies:

The tile_group_address is the tile index of the tile located at the top-left corner of the i-th tile group.

The length of tile_group_address is signalled_tile_group_index_length_minus1+1 bits.

If signalled tile_group_id_flag is equal to 0, the value of tile_group_address shall be in the range of 0 to NumTilesInPic−1, inclusive. Otherwise, the value of tile_group_address shall be in the range of 0 to to $2^{(signalled\_tile\_group\_index\_length\_minus1+1)}-1$, inclusive.

Else (rect_tile_group_flag is equal to 1 and rect_tile_group_info_in_pps is equal to 1), the following applies:

The tile_group_address is the tile group ID of the tile group.

The length of tile_group_address is signalled_tile_group_index_length_minus1+1 bits.

If signalled tile_group_id flag is equal to 0, the value of tile_group_address shall be in the range of 0 to num_tile_groups_in_pic_minus1, inclusive. Otherwise, the value of tile_group_address shall be in the range of 0 to $2^{(signalled\_tile\_group\_index\_length\_minus1+1)}-1$, inclusive.

bottom_right_tile_id specifies the tile index of the tile located at the bottom-right corner of the tile group. When single_tile_per_tile_group_flag is equal to 1 bottom_right_tile_id is inferred to be equal to tile_group_address. The length of the bottom_right_tile_id syntax element is Ceil (Log 2(NumTilesInPic)) bits.

The variable NumTilesInCurrTileGroup, which specifies the number of tiles in the current tile group, TopLeftTileIdx which specifies the tile index of the top left tile of the tile group, BottomRightTileIdx which specifies the tile index of the bottom right tile of the tile group, and TgTileIdx[i], which specifies the tile index of the i-th tile in the current tile group, are derived as follows:

```
if( rect_tile_group_flag ) {
    if ( tile_group_info_in_pps ) {
        tileGroupIdx = 0
        while( tile_group_address != rect_tile_group_id[ tileGroupIdx ]
        )
            tileGroupIdx++
        tileIdx = top_left_tile_idx[ tileGroupIdx ]
        BottomRightTileIdx = bottom_right_tile_idx[ tileGroupIdx ]
    } else {
        tileIdx = tile_group_address
        BottomRightTileIdx = bottom_right_tile_id
    }
    TopLeftTileIdx = tileIdx
    deltaTileIdx = BottomRightTileIdx - TopLeftTileIdx
    NumTileRowsInTileGroupMinus1 = deltaTileIdx/
    (num_tile_columns_minus1 + 1)   (7-35)
    NumTileColumnsInTileGroupMinus1 = deltaTileIdx %
( num_tile_columns_minus1 + 1 )
    NumTilesInCurrTileGroup = ( NumTileRowsInTileGroupMinus1 +
    1 ) *
            ( NumTileColumnsInTileGroupMinus1 + 1 )
    for( j = 0, tIdx = 0; j < NumTileRowsInTileGroupMinus1 + 1;
            j++, tileIdx += num_tile_columns_minus1 + 1 )
        for( i = 0, currTileIdx = tileIdx; i <
        NumTileColumnsInTileGroupMinus1 + 1;
                i++, currTileIdx++, tIdx++ )
            TgTileIdx[ tIdx ] = currTileIdx
} else {
    NumTilesInCurrTileGroup = num_tiles_in_tile_group_minus1 + 1
    TgTileIdx[ 0 ] = tile_group_address
    for( i = 1; i < NumTilesInCurrTileGroup; i++ )
        TgTileIdx[ i ] = TgTileIdx[ i - 1 ] + 1
}
```

*recovery_poc_cnt* specifies the recovery point of decoded pictures in output order. If there is a picture picA that follows the current picture (i.e., a GDR picture) in decoding order in the CVS and that has PicOrderCntVal equal to the PicOrderCntVal of the current picture plus the value of recovery_poc_cnt, the picture picA is referred to as the recovery point picture. Otherwise, the first picture in output order that has PicOrderCntVal greater than the PicOrderCntVal of the current picture plus the value of recovery_poc_cnt is referred to as the recovery point picture. The recovery point picture shall not precede the current picture in decoding order. All decoded pictures in output order are indicated to be correct or approximately correct in content starting at the output order position of the recovery point picture. The value of recovery_poc_cnt shall be in the range of −MaxPicOrderCntLsb/2 to MaxPicOrderCntLsb/2−1, inclusive.

The value RecoveryPointPocVal is derived as follows:
RecoveryPointPocVal=PicOrderCntVal+recovery_poc_cnt

*refreshed_region_flag* equal to 1 specifies that the decoding of the tile group produces correct reconstructed samples values regardless whether the value of NoIncorrectPicOutputFlag of the associated GDR. refreshed_region_ flag equal to 0 specifies that the decoding of the tile group may produce incorrect reconstructed samples values when it starts from the associated GDR with NoIncorrectPicOutputFlag equal to 1. When not present, the value of refreshed_region_flag is inferred to be equal to 1.

NOTE x—The current picture itself can be the GDR picture with NoIncorrectPicOutputFlag equal to 1.

The tile group refreshed boundaries are derived as follows:

tileColIdx=TopLeftTileIdx % (num_tile_columns_minus1+1)
tileRowIdx=TopLeftTileIdx/(num_tile_columns_minus1+1)
TGRefreshedLeftBoundary=ColBd[tileColIdx]<<CtbLog2SizeY
TGRefreshedTopBoundary=RowBd[tileRowIdx]<<CtbLog2SizeY
tileColIdx=BottomRightTileIdx % (num_tile_columns_minus1+1)
tileRowIdx=BottomRightTileIdx/(num_tile_columns_minus1+1)
TGRefreshedRightBoundary=((ColBd[tileColIdx]+ColWidth[tileColIdx])<<CtbLog2SizeY)−1
TGRefreshedRightBoundary=TGRefreshedRightBoundary>pic_width_in_luma_samples?pic_width_in_luma_samples:TGRefreshedRightBoundary
TGRefreshedBotBoundary=((RowBd[tileRowIdx]+RowHeight[tileRowIdx])<<CtbLog2SizeY)−1
TGRefreshedBotBoundary=TGRefreshedBotBoundary>pic_height_in_luma_samples? pic_height_in_luma_samples TGRefreshedBotBoundary NAL unit header semantics.

TABLE 7-1

NAL unit type codes and NAL unit type classes

| nal_unit_type | Name of nal_unit_type | Content of NAL unit and RBSP syntax structure | NAL unit type class |
|---|---|---|---|
| 0 | TRAIL_NUT | Coded tile group of a non-STSA trailing picture tile_group_layer_rbsp( ) | VCL |
| 1 | STSA_NUT | Coded tile group of an STSA picture tile_group_layer_rbsp( ) | VCL |
| 2 | RASL_NUT | Coded tile group of a RASL picture tile_group_layer_rbsp( ) | VCL |
| 3 | RADL_NUT | Coded tile group of a RADL picture tile_group_layer_rbsp( ) | VCL |
| 4 . . . 7 | RSV_VCL4 . . . RSV_VCL_7 | Reserved non-IRAP VCL NAL unit types | VCL |
| 8<br>9 | IDR_W_RADL<br>IDR_N_LP | Coded tile group of an IDR picture tile_group_layer(rbsp( ) | VCL |
| 10 | CRA_NUT | Coded tile group of a CRA picture tile_group_layer_rbsp( ) | VCL |
| 11<br>12 | RSV_IRAP_VCL11<br>RSV_IRAP_VCL12 | Reserved IRAP VCL NAL unit types | VCL |

TABLE 7-1-continued

NAL unit type codes and NAL unit type classes

| nal_unit_type | Name of nal_unit_type | Content of NAL unit and RBSP syntax structure | NAL unit type class |
|---|---|---|---|
| 13 | GDR_NUT | Coded tile group of a GDR picture tile_group_layer_rbsp( ) | VCL |
| 14 . . . 15 | RSV_VCL14 . . . RSV_VCL15 | Reserved non-IRAP VCL NAL unit types | VCL |
| 16 | SPS_NUT | Sequence parameter set seq_parameter_set_rbsp( ) | non-VCL |
| 17 | PPS_NUT | Picture parameter set pic_parameter_set_rbsp( ) | non-VCL |
| 18 | APS_NUT | Adaptation parameter set adaptation_parameter_set_rbsp( ) | non-VCL |
| 19 | AUD_NUT | Access unit delimiter access_unit_delimiter_rbsp( ) | non-VCL |
| 20 | EOS_NUT | End of sequence end_of_seq_rbsp( ) | non-VCL |
| 21 | EOB_NUT | End of bitstream end_of_bitstream_rbsp( ) | non-VCL |
| 22, 23 | PREFIX_SEI_NUT SUFFIX_SEI_NUT | Supplemental enhancement information sei_rbsp( ) | non-VCL |
| 24 . . . 27 | RSV_NVCL24 . . . RSV_NVCL27 | Reserved non-VCL NAL unit types | non-VCL |
| 28 . . . 31 | UNSPEC28 . . . UNSPEC31 | Unspecified non-VCL NAL unit types | non-VCL |

When nal_unit_type is equal to GDR_NUT, the coded tile group belongs to a GDR picture, TemporalId shall be equal to 0.

Order of access units and association to CVSs is discussed.

A bitstream conforming to this Specification (i.e., JVET contribution JVET-M1001-v5) includes one or more CVSs.

A CVS includes one or more access units. The order of NAL units and coded pictures and their association to access units is described in clause 7.4.2.4.4.

The first access unit of a CVS is one of the following:
an TRAP access unit with NoBrokenPictureOutputFlag equal to 1.
a GDR access unit with NoIncorrectPicOutputFlag equal to 1.

It is a requirement of bitstream conformance that, when present, the next access unit after an access unit that contains an end of sequence NAL unit or an end of bitstream NAL unit shall be one of the following:
an IRAP access unit, which may be an IDR access unit or a CRA access unit.
a GDR access unit.

8.1.1 Decoding process for a coded picture is discussed.
. . .
When the current picture is an IRAP picture, the following applies:
When the current picture is an IDR picture, the first picture in the bitstream in decoding order, or the first picture that follows an end of sequence NAL unit in decoding order, the variable NoIncorrectPicOutputFlag is set equal to 1.
Otherwise, when some external means not specified in this Specification (e.g., a user input) is available to set the variable HandleCraAsCvsStartFlag to a value for the current picture, the variable HandleCraAsCvsStartFlag is set equal to the value provided by the external means and the variable NoIncorrectPicOutputFlag is set equal to HandleCraAsCvsStartFlag.
Otherwise, the variable HandleCraAsCvsStartFlag is set equal to 0 and the variable NoIncorrectPicOutputFlag is set equal to 0.

When the current picture is a GDR picture, the following applies:
When the current picture is a GDR picture, the first picture in the bitstream in decoding order, or the first picture that follows an end of sequence NAL unit in decoding order, the variable NoIncorrectPicOutputFlag is set equal to 1.
Otherwise, when some external means not specified in this Specification is available to set the variable HandleGdrAsCvsStartFlag to a value for the current picture, the variable HandleGdrAsCvsStartFlag is set equal to the value provided by the external means and the variable NoIncorrectPicOutputFlag is set equal to Handle GdrAsCvsStartFlag.
Otherwise, the variable HandleGdrAsCvsStartFlag is set equal to 0 and the variable NoIncorrectPicOutputFlag is set equal to 0.
. . .
The decoding process operates as follows for the current picture CurrPic:
1. The decoding of NAL units is specified in clause 8.2.
2. The processes in clause 8.3 specify the following decoding processes using syntax elements in the tile group header layer and above:
Variables and functions relating to picture order count are derived as specified in clause 8.3.1. This needs to be invoked only for the first tile group of a picture.
At the beginning of the decoding process for each tile group of a non-IDR picture, the decoding process for reference picture lists construction specified in clause 8.3.2 is invoked for derivation of reference picture list 0 (RefPicList[0]) and reference picture list 1 (RefPicList[1]).
The decoding process for reference picture marking in clause 8.3.3 is invoked, wherein reference pictures may be marked as "unused for reference" or "used for long-term reference." This is invoked only for the first tile group of a picture.
PicOutputFlag is set as follows:
When one of the following conditions is true, PictureOutputFlag is set equal to 0:
the current picture is a RASL picture and NoIncorrectPicOutputFlag of the associated IRAP picture is equal to 1.
gdr_enabled_flag is equal to 1 and the current picture is GDR picture with NoIncorrectPicOutputFlag equal to 1.
gdr_enabled_flag is equal to 1 and the current picture contains one or more tile group with refreshed_region_flag equal to 0 and NoBrokenPictureOutputFlag of the associated GDR picture is equal to 1.
Otherwise, PicOutputFlag is set equal to 1.
3. The decoding processes is invoked for coding tree units, scaling, transform, in-loop filtering, etc.
4. After all tile groups of the current picture have been decoded, the current decoded picture is marked as "used for short-term reference."
Decoding process for picture order count is discussed.
Output of this process is PicOrderCntVal, the picture order count of the current picture.
Each coded picture is associated with a picture order count variable, denoted as PicOrderCntVal.

When the current picture is not an IRAP picture with NoIncorrectPicOutputFlag equal to 1 or a GDR picture with NoIncorrectPicOutputFlag equal to 1, the variables prevPicOrderCntLsb and prevPicOrderCntMsb are derived as follows:

Let prevTid0Pic be the previous picture in decoding order that has TemporalId equal to 0 and that is not a RASL or RADL picture.

The variable prevPicOrderCntLsb is set equal to tile_group_pic_order_cnt_lsb of prevTid0Pic.

The variable prevPicOrderCntMsb is set equal to PicOrderCntMsb of prevTid0Pic.

The variable PicOrderCntMsb of the current picture is derived as follows:

When the current picture is an IRAP picture with NoIncorrectPicOutputFlag equal to 1 or a GDR picture with NoIncorrectPicOutputFlag equal to 1, PicOrderCntMsb is set equal to 0.

Otherwise, PicOrderCntMsb is derived as follows:

```
if( ( tile_group_pic_order_cnt_lsb < prevPicOrderCntLsb ) &&
    ( ( prevPicOrderCntLsb − tile_group_pic_order_cnt_lsb ) >= (
MaxPicOrderCntLsb / 2 ) ) )
  PicOrderCntMsb = prevPicOrderCntMsb + MaxPicOrderCntLsb   (8-1)
else if( (tile_group_pic_order_cnt_lsb > prevPicOrderCntLsb ) &&
    ( ( tile_group_pic_order_cnt_lsb − prevPicOrderCntLsb ) > (
MaxPicOrderCntLsb / 2 ) ) )
  PicOrderCntMsb = prevPicOrderCntMsb − MaxPicOrderCntLsb
else
  PicOrderCntMsb = prevPicOrderCntMsb
```

PicOrderCntVal is derived as follows:

PicOrderCntVal=PicOrderCntMsb+tile_group_pi-c_order_cnt_lsb (8-2)

NOTE 1—All IRAP pictures with NoIncorrectPicOutputFlag equal to 1 will have PicOrderCntVal equal to tile_group_pic_order_cnt_lsb since for IRAP pictures with NoIncorrectPicOutputFlag equal to 1 PicOrderCntMsb is set equal to 0.

NOTE 1—All GDR pictures with NoIncorrectPicOutputFlag equal to 1 will have PicOrderCntVal equal to tile_group_pic_order_cnt_lsb since for GDR pictures with NoIncorrectPicOutputFlag equal to 1 PicOrderCntMsb is set equal to 0.

The value of PicOrderCntVal shall be in the range of $-2^{31}$ to $2^{31}-1$, inclusive.

When the current picture is a GDR picture, the value of LastGDRPocVal is set to be equal to PicOrderCntVal.

Decoding process for picture refreshed boundary position is discussed.

This process is invoked only when gdr_enabled_flag is equal to 1.

This process is invoked after the tile group header parsing is completed.

Output of this process is PicRefreshedLeftBoundaryPos, PicRefreshedRightBoundaryPos, PicRefreshedTopBoundaryPos, and PicRefreshedBotBoundaryPos, the boundary position of refreshed region of the current picture.

Each coded picture is associated with a set of refreshed region boundary positions variables, denoted as PicOrderCntVal.

PicRefreshedLeftBoundaryPos, PicRefreshedRightBoundaryPos, PicRefreshedTopBoundaryPos, and PicRefreshedBotBoundaryPos are derived as follows:

If the tile group is the first received tile group of the current picture with refreshed_region_flag equal to 1, the following apply:

PicRefreshedLeftBoundaryPos=TGRefreshedLeftBoundary

PicRefreshedRightBoundaryPos=TGRefreshedRightBoundary

PicRefreshedTopBoundaryPos=TGRefreshedTopBoundary

PicRefreshedBotBoundaryPos=TileGroupBotBoundary

Else if refreshed_region_flag is equal to 1, the followings apply:

PicRefreshedLeftBoundaryPos=TGRefreshedLeftBoundary<PicRefreshedLeftBoundaryPos?

TGRefreshedLeftBoundary: PicRefreshedLeftBoundaryPos

PicRefreshedRightBoundaryPos=TGRefreshedRightBoundary>PicRefreshedRightBoundaryPos?

TGRefreshedRightBoundary: PicRefreshedRightBoundaryPos

PicRefreshedTopBoundaryPos=TGRefreshedTopBoundary<PicRefreshedTopBoundaryPos?

TGRefreshedTopBoundary: RefreshedRegionTopBoundaryPos

PicRefreshedBotBoundaryPos=TileGroupBotBoundary>PicRefreshedBotBoundaryPos?

TileGroupBotBoundary: PicRefreshedBotBoundaryPos

Decoding process for reference picture lists construction is discussed.

. . .

It is a requirement of bitstream conformance that for each current picture that is not an IRAP picture with NoIncorrectPicOutputFlag equal to 1 or a GDR picture with NoIncorrectPicOutputFlag equal to 1, the value of maxPicOrderCnt−minPicOrderCnt shall be less than MaxPicOrderCntLsb/2.

. . .

Decoding process for reference picture marking

. . .

If the current picture is an IRAP picture with NoIncorrectPicOutputFlag equal to 1 or a GDR picture with NoIncorrectPicOutputFlag equal to 1, all reference pictures currently in the DPB (if any) are marked as "unused for reference."

. . .

Derivation process for temporal luma motion vector prediction is discussed.

. . .

The variable currCb specifies the current luma coding block at luma location (xCb, yCb).

The variables mvLXCol and availableFlagLXCol are derived as follows:

If tile_group_temporal_mvp_enabled_flag is equal to 0, both components of mvLXCol are set equal to 0 and availableFlagLXCol is set equal to 0.

Otherwise (tile_group_temporal_mvp_enabled_flag is equal to 1), the following ordered steps apply:

1. The bottom right collocated motion vector is derived as follows:

xColBr=xCb+cbWidth (8-414)

yColBr=yCb+cbHeight (8-415)

leftBoundaryPos=gdr_enabled_flag?

PicRefreshedLeftBoundaryPos of picture referred to by RefPicList[X][refIdxLX]:

0 (8-415)

topBoundaryPos=gdr_enabled_flag?

PicRefreshedTopBoundaryPos of picture referred to by RefPicList[X][refIdxLX]:

$$0 \qquad (8\text{-}415)$$

rightBoundaryPos=gdr_enabled_flag? PicRefreshedRightBoundaryPos of picture referred to by RefPicList[X][refIdxLX]:

$$pic\_width\_in\_luma\_samples \qquad (8\text{-}415)$$

botBoundaryPos=gdr_enabled_flag? PicRefreshedBotBoundaryPos of picture referred to by RefPicList[X][refIdxLX]:

$$pic\_height\_in\_luma\_samples \qquad (8\text{-}415)$$

If yCb>>CtbLog2SizeY is equal to yColBr>>CtbLog2SizeY, yColBr is in the range from topBoundaryPos to botBoundaryPos, inclusive, and xColBr is in the range from leftBoundaryPos to rightBoundaryPos, inclusive, the following applies:

The variable colCb specifies the luma coding block covering the modified location given by (((xColBr>>3)<<3, (yColBr>>3)<<3) inside the collocated picture specified by ColPic.

The luma location (xColCb, yColCb) is set equal to the top-left sample of the collocated luma coding block specified by colCb relative to the top-left luma sample of the collocated picture specified by ColPic.

The derivation process for collocated motion vectors as specified in clause 8.5.2.12 is invoked with currCb, colCb, (xColCb, yColCb), refIdxLX and sbFlag set equal to 0 as inputs, and the output is assigned to mvLXCol and availableFlagLXCol.

Otherwise, both components of mvLXCol are set equal to 0 and availableFlagLXCol is set equal to 0.

2. . . .

Luma sample bilinear interpolation process is discussed.
Inputs to this process are:
a luma location in full-sample units ($xInt_L$, $yInt_L$),
a luma location in fractional-sample units ($xFrac_L$, $yFrac_L$),
the luma reference sample array $refPicLX_L$.
the refreshed region boundaries of the reference picture PicRefreshedLeftBoundaryPos, PicRefreshedTopBoundaryPos, PicRefreshedRightBoundaryPos, and PicRefreshedBotBoundaryPos.

The luma locations in full-sample units ($xInt_i$, $yInt_i$) are derived as follows for i=0 . . . 1:
If gdr_enabled_flag is equal to 1, the following applies:

$$xInt_i=\text{Clip3}(\text{PicRefreshedLeftBoundaryPos},\text{PicRefreshedRightBoundaryPos},xInt_L+i) \qquad (8\text{-}458)$$

$$yInt_i=\text{Clip3}(\text{PicRefreshedTopBoundaryPos},\text{PicRefreshedBotBoundaryPos},yInt_L+i) \qquad (8\text{-}458)$$

Otherwise (gdr_enabled_flag is equal to 0), the following applies:
$xInt_i$=sps_ref_wraparound_enabled_flag?

$$\text{Clip}H((sps\_ref\_wraparound\_offset\_minus1+1)*\text{MinCbSize}Y,picW,(xInt_L+i)): \qquad (8\text{-}459)$$

$$\text{Clip3}(0,picW-1,xInt_L+i)$$

$$yInti=\text{Clip3}(0,picH-1,yInt_L+i) \qquad (8\text{-}460)$$

. . .

Luma sample 8-tap interpolation filtering process is discussed.
Inputs to this process are:
a luma location in full-sample units ($xInt_L$, $yInt_L$),
a luma location in fractional-sample units ($xFrac_L$, $yFrac_L$),
the luma reference sample array $refPicLX_L$,
a list padVal[dir] with dir=0,1 specifying reference sample padding direction and amount.
the refreshed region boundaries of the reference picture PicRefreshedLeftBoundaryPos, PicRefreshedTopBoundaryPos, PicRefreshedRightBoundaryPos, and PicRefreshedBotBoundaryPos.

. . .

The luma locations in full-sample units ($xInt_i$, $yInt_i$) are derived as follows for i=0 . . . 7:
If gdr_enabled_flag is equal to 1, the following applies:

$$xInt_i=\text{Clip3}(\text{PicRefreshedLeftBoundaryPos},\text{PicRefreshedRightBoundaryPos},xInt_L+i-3) \qquad (8\text{-}830)$$

$$yInt_i=\text{Clip3}(\text{PicRefreshedTopBoundaryPos},\text{PicRefreshedBotBoundaryPos},yInt_L+i-3) \qquad (8\text{-}830)$$

Otherwise (gdr_enabled_flag is equal to 0), the following applies:
$xInt_i$=sps_ref_wraparound_enabled_flag?

$$\text{Clip}H((sps\_ref\_wraparound\_offset\_minus1+1)*\text{MinCbSize}Y,picW,xInt_L+i-3): \qquad (8\text{-}831)$$

$$\text{Clip3}(0,picW-1,xInt_L+i-3)$$

$$yInt_i=\text{Clip3}(0,picH-1,yInt_L+i-3) \qquad (8\text{-}832)$$

Chroma sample interpolation process is discussed.
Inputs to this process are:
a chroma location in full-sample units ($xInt_C$, $yInt_C$),
a chroma location in 1/32 fractional-sample units ($xFrac_C$, $yFrac_C$),
the chroma reference sample array $refPicLX_C$.
the refreshed region boundaries of the reference picture PicRefreshedLeftBoundaryPos, PicRefreshedTopBoundaryPos, PicRefreshedRightBoundaryPos, and PicRefreshedBotBoundaryPos.

. . .

The variable xOffset is set equal to (sps_ref_wraparound_offset_minus1+1)*MinCbSizeY/SubWidthC.

The chroma locations in full-sample units ($xInt_i$, $yInt_i$) are derived as follows for i=0 . . . 3:
If gdr_enabled_flag is equal to 1, the following applies:

$$xInt_i=\text{Clip3}(\text{PicRefreshedLeftBoundaryPos}/\text{Sub}\text{Width}C,\text{PicRefreshedRightBoundaryPos}/\text{Sub}\text{Width}C,xInt_L+i) \qquad (8\text{-}844)$$

$$yInt_i=\text{Clip3}(\text{PicRefreshedTopBoundaryPos}/\text{Sub}\text{Height}C,\text{PicRefreshedBotBoundaryPos}/\text{Sub}\text{Height}C,yInt_L+i) \qquad (8\text{-}844)$$

Otherwise (gdr_enabled_flag is equal to 0), the following applies:

$$xInt_i=sps\_ref\_wraparound\_enabled\_flag?\text{Clip}H(xOffset,picW_C,xInt_C+i-1): \qquad (8\text{-}845)$$

$$\text{Clip3}(0,picW_C-1,xInt_C+i-1)$$

$$yInt_i=\text{Clip3}(0,picH_C-1,yInt_C+i-1) \qquad (8\text{-}846)$$

Deblocking filter process is discussed.
General process.

. . .

The deblocking filter process is applied to all coding subblock edges and transform block edges of a picture, except the following types of edges:
Edges that are at the boundary of the picture,
Edges that coincide with upper boundary of tile group tgA when all the following are satisfied:

gdr_enabled_flag is equal to 1
loop__filter_across_refreshed_region_enabled_flag equal to 0
the edges coincide with bottom boundary of tile group tgB and the value of refreshed_region_flag of tgB is different from the value of refreshed_region_flag of tgA Edges that coincide with left boundary of tile group tgA when all the following are satisfied:
gdr_enabled_flag is equal to 1
loop_filter_across_refreshed_region_enabled_flag equal to 0
the edges coincide with right boundary of tile group tgB and the value of refreshed_region_flag of tgB is different from the value of refreshed_region_flag of tgA Edges that coincide with tile boundaries when loop_filter_across_tiles_enabled_flag is equal to 0, Edges that coincide with upper or left boundaries of tile groups with tile_group_loop_filter_across_tile_groups_enabled_flag equal to 0 or tile_group_deblocking_filter_disabled_flag equal to 1, Edges within tile groups with tile_group_deblocking_filter_disabled_flag equal to 1, Edges that do not correspond to 8×8 sample grid boundaries of the considered component, Edges within chroma components for which both sides of the edge use inter prediction, Edges of chroma transform blocks that are not edges of the associated transform unit.

Edges across the luma transform blocks of a coding unit that has an IntraSubPartitionsSplit value not equal to ISP_NO_SPLIT.

Deblocking filter process for one direction is discussed.
. . .

For each coding unit with coding block width log 2CbW, coding block height log 2CbH and location of top-left sample of the coding block (xCb, yCb), when edgeType is equal to EDGE_VER and xCb % 8 is equal 0 or when edgeType is equal to EDGE_HOR and yCb % 8 is equal to 0, the edges are filtered by the following ordered steps:

1. The coding block width nCbW is set equal to 1<<log 2CbW and the coding block height nCbH is set equal to 1<<log 2CbH 2. The variable filterEdgeFlag is derived as follows:
If edgeType is equal to EDGE_VER and one or more of the following conditions are true, filterEdgeFlag is set equal to 0:
The left boundary of the current coding block is the left boundary of the picture.
The left boundary of the current coding block is the left boundary of the tile and loop_filter_across_tiles_enabled_flag is equal to 0.
The left boundary of the current coding block is the left boundary of the tile group and tile_group_loop_filter_across_tile_groups_enabled_flag is equal to 0.
The left boundary of the current coding block is the left boundary of the current tile group and all the following conditions are satisfied:
gdr_enabled_flag is equal to 1
loop_filter_across_refreshed_region_enabled_flag is equal to 0.
the tile group that shared boundary with the left boundary of the current tile group is present and the value of its refreshed_region_flag is different from the value of refreshed_region_flag of the current tile group.
Otherwise if edgeType is equal to EDGE_HOR and one or more of the following conditions are true, the variable filterEdgeFlag is set equal to 0:
The top boundary of the current luma coding block is the top boundary of the picture.
The top boundary of the current coding block is the top boundary of the tile and loop_filter_across_tiles_enabled_flag is equal to 0.
The top boundary of the current coding block is the top boundary of the tile group and tile_group_loop_filter_across_tile_groups_enabled_flag is equal to 0.
The top boundary of the current coding block is the top boundary of the current tile group and all the following conditions are satisfied:
gdr_enabled_flag is equal to 1
loop_filter_across_refreshed_region_enabled_flag is equal to 0.
the tile group that shared boundary with the top boundary of the current tile group is present and the value of its refreshed_region_flag is different from the value of refreshed_region_flag of the current tile group.
Otherwise, filterEdgeFlag is set equal to 1.
Adapt syntax once tiles are integrated.

3. All elements of the two-dimensional (nCbW)×(nCbH) array edgeFlags are initialized to be equal to zero.

CTB modification process for SAO is discussed.
. . .

For all sample locations $(xS_i, yS_j)$ and $(xY_i, yY_j)$ with $i=0 \ldots nCtbSw-1$ and $j=0 \ldots nCtbSh-1$, depending on the values of pcm_loop_filter_disabled_flag, pcm_flag[$xY_i$][$yY_j$] and cu_transquant_bypass_flag of the coding unit which includes the coding block covering recPicture[xSi][ySj], the following applies:
. . .

Modify highlighted sections depending on future decision transform/quantization bypass.

Otherwise, if SaoTypeIdx[cIdx][rx][ry] is equal to 2, the following ordered steps apply:

1. The values of hPos[k] and vPos[k] for k=0 . . . 1 are specified in Table 8-18 based on SaoEoClass[cIdx][rx][ry].

2. The variable edgeIdx is derived as follows:
The modified sample locations $(xS_{ik'}, yS_{ik'})$ and $(xY_{ik'}, yY_{jk'})$ are derived as follows:

$$(xS_{ik'}, yS_{ik'}) = (xS_i + hPos[k], yS_j + vPos[k]) \quad (8\text{-}1128)$$

$$(xY_{ik'}, yY_{jk'}) = (cIdx==0)?(xS_{ik'}, yS_{ik'}) (xS_{ik'} * SubWidthC, yS_{ik'} * SubHeightC) \quad (8\text{-}1129)$$

If one or more of the following conditions for all sample locations $(xS_{ik'}, yS_{ik'})$ and $(xY_{ik'}, yY_{jk'})$ with k=0 . . . 1 are true, edgeIdx is set equal to 0:
The sample at location $(xS_{ik'}, yS_{ik'})$ is outside the picture boundaries.
gdr_enabled_flag is equal o 1, loop_filter_across_refreshed_region_enabled_flag is equal to 0, refreshed_region_flag of the current tile group is equal to 1, and refreshed_region_flag of the tile group containing the sample at location $(xS_{ik'}, yS_{ik'})$ is equal to 0.
The sample at location $(xS_{ik'}, yS_{ik'})$ belongs to a different tile group and one of the following two conditions is true:
MinTbAddrZs[$xY_{ik}$>>MinTbLog2SizeY][$yY_{jk}$>>MinTbLog2SizeY] is less than MinTbAddrZs[$xY_i$>>MinTbLog2SizeY][$yY_j$>>MinTbLog2SizeY] and tile_group_loop_filter_across_tile_groups_enabled_flag in the tile group which the sample recPicture[xSi][yS_j] belongs to is equal to 0.
MinTbAddrZs[$xY_i$>>MinTbLog2SizeY][$yY_j$>>MinTbLog2SizeY] is less than MinTbAddrZs[$xY_{ik}$>>MinTbLog2SizeY]

[yY$_{jk}$>>MinTbLog2SizeY] and tile_group_loop_filter_across_tile_groups_enabled_flag in the tile group which the sample recPicture[xS$_{ik'}$][yS$_{ik'}$] belongs to is equal to 0.

loop_filter_across_tiles_enabled_flag is equal to 0 and the sample at location (xS$_{ik'}$, yS$_{ik'}$) belongs to a different tile.

Modify highlighted sections when tiles without tile groups are incorporated

Otherwise, edgeIdx is derived as follows:
The following applies:

edgeIdx=2+Sign(recPicture[xS$_i$][yS$_j$]−recPicture[xS$_i$+hPos[0]][yS$_i$+vPos[0]])+

Sign(recPicture[xS$_i$][yS$_j$]−recPicture[xS$_i$+hPos[1]][yS$_j$+vPos[1]])   (8-1130)

When edgeIdx is equal to 0, 1, or 2, edgeIdx is modified as follows:

edgeIdx=(edgeIdx==2)?0:(edgeIdx+1)   (8-1131)

3. The modified picture sample array saoPicture[xS$_i$][yS$_i$] is derived as follows:

saoPicture[xS$_i$][yS$_i$]=Clip3(0,(1<<bitDepth)−1,recPicture[xS$_i$][yS$_i$]+SaoOffsetVal[cIdx][rx][ry][edgeIdx])   (8-1132)

Coding tree block filtering process for luma samples for ALF is discussed.

. . .

For the derivation of the filtered reconstructed luma samples alfPictureL[x][y], each reconstructed luma sample inside the current luma coding tree block recPictureL[x][y] is filtered as follows with x, y=0 . . . CtbSizeY−1:

. . .

The locations (h$_x$, v$_y$) for each of the corresponding luma samples (x,y) inside the given array recPicture of luma samples are derived as follows:

If gdr_enabled_flag is equal to 1, loop_filter_across_refreshed_region_enabled_flag is equal to 0, refreshed_region_flag of the tile group tgA containing the luma sample at location (x,y) is equal to 1, the following applies:

If the location (h$_x$, v$_y$) is located in another tile group tgB and the refreshed_region_flag of tgB is equal to 0, the variables leftBoundary, rightBoundary, topBoundary, and botBoundary are set equal to TGRefreshedLeftBoundary, TGRefreshedRightBoundary, TGRefreshedTopBoundary, and TGRefreshedBotBoundary, respectively.

Otherwise, the variables leftBoundary, rightBoundary, topBoundary, and botBoundary are set equal to PicRefreshedLeftBoundaryPos, PicRefreshedRightBoundaryPos, PicRefreshedTopBoundaryPos, and PicRefreshedBotBoundaryPos, respectively.

h$_x$=Clip3(leftBoundary,rightBoundary,xCtb+x)   (8-1140)

v$_y$=Clip3(topBoundary,botBoundary,yCtb+y)   (8-1141)

Otherwise, the following applies:

h$_x$=Clip3(0,pic_width_in_luma_samples−1,xCtb+x)   (8-1140)

v$_y$=Clip3(0,pic_height_in_luma_samples−1,yCtb+y)   (8-1141)

. . .

The derivation process for ALF transpose and filter index for luma samples is discussed.

The locations (h$_x$, v$_y$) for each of the corresponding luma samples (x,y) inside the given array recPicture of luma samples are derived as follows:

If gdr_enabled_flag is equal to 1, loop_filter_across_refreshed_region_enabled_flag is equal to 0, refreshed_region_flag of the tile group tgA containing the luma sample at location (x,y) is equal to 1, the following applies:

If the location (h$_x$, v$_y$) is located in another tile group tgB and the refreshed_region_flag of tgB is equal to 0, the variables leftBoundary, rightBoundary, topBoundary, and botBoundary are set equal to TGRefreshedLeftBoundary, TGRefreshedRightBoundary, TGRefreshedTopBoundary, and TGRefreshedBotBoundary, respectively.

Otherwise, the variables leftBoundary, rightBoundary, topBoundary, and botBoundary are set equal to PicRefreshedLeftBoundaryPos, PicRefreshedRightBoundaryPos, PicRefreshedTopBoundaryPos, and PicRefreshedBotBoundaryPos, respectively.

h$_x$=Clip3(leftBoundary,rightBoundary,x)   (8-1140)

v$_y$=Clip3(topBoundary,botBoundary,y)   (8-1141)

Otherwise, the following applies:

h$_x$=Clip3(0,pic_width_in_luma_samples−1,x)   (8-1145)

v$_y$=Clip3(0,pic_height_in_luma_samples−1,y)   (8-1146)

Coding tree block filtering process for chroma samples is discussed.

. . .

For the derivation of the filtered reconstructed chroma samples alfPicture[x][y], each reconstructed chroma sample inside the current chroma coding tree block recPicture[x][y] is filtered as follows with x, y=0 . . . ctbSizeC−1:

The locations (h$_x$, v$_y$) for each of the corresponding chroma samples (x,y) inside the given array recPicture of chroma samples are derived as follows:

If gdr_enabled_flag is equal to 1, loop_filter_across_refreshed_region_enabled_flag is equal to 0, refreshed_region_flag of the tile group tgA containing the luma sample at location (x,y) is equal to 1, the following applies:

If the location (h$_x$, v$_y$) is located in another tile group tgB and the refreshed_region_flag of tgB is equal to 0, the variables leftBoundary, rightBoundary, topBoundary, and botBoundary are set equal to TGRefreshedLeftBoundary, TGRefreshedRightBoundary, TGRefreshedTopBoundary, and TGRefreshedBotBoundary, respectively.

Otherwise, the variables leftBoundary, rightBoundary, topBoundary, and botBoundary are set equal to PicRefreshedLeftBoundaryPos, PicRefreshedRightBoundaryPos, PicRefreshedTopBoundaryPos, and PicRefreshedBotBoundaryPos, respectively.

h$_x$=Clip3(leftBoundary/SubWidthC,rightBoundary/SubWidthC,xCtbC+x)   (8-1140)

v$_y$=Clip3(topBoundary/SubWidthC,botBoundary/SubWidthC,yCtbC+y)   (8-1141)

Otherwise, the following applies:

h$_x$=Clip3(0,pic_width_in_luma_samples/SubWidthC−1,xCtbC+x)   (8-1177)

v$_y$=Clip3(0,pic_height_in_luma_samples/SubHeightC−1,yCtbC+y)   (8-1178)

Figure 7:
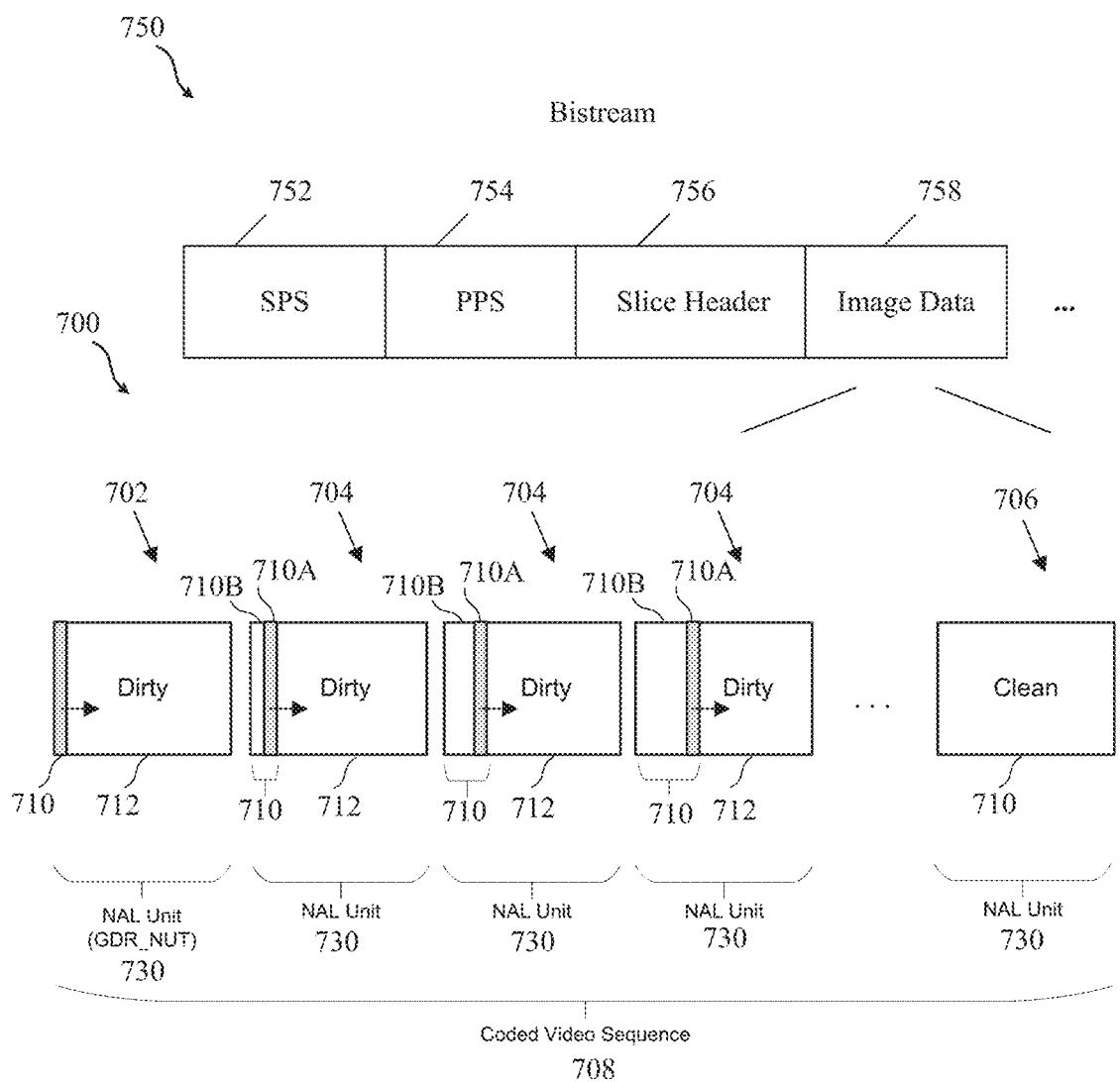
FIG. 7 illustrates a bitstream depicting a gradual decoding refresh technique according to an embodiment of the disclosure.

FIG. 7 illustrates a video bitstream 750 configured to implement a gradual decoding refresh (GDR) technique 700 according to an embodiment of the disclosure. The GDR technique 700 may be similar to the GDR technique 500 of FIG. 5. As used herein the video bitstream 750 may also be referred to as a coded video bitstream, a bitstream, or variations thereof. As shown in FIG. 7, the bitstream 750 comprises a sequence parameter set (SPS) 752, a picture parameter set (PPS) 754, a slice header 756, and image data 758.

The SPS 752 contains data that is common to all the pictures in a sequence of pictures (SOP). In contrast, the PPS 754 contains data that is common to the entire picture. The slice header 756 contains information about the current slice such as, for example, the slice type, which of the reference pictures will be used, and so on. The SPS 752 and the PPS 754 may be generically referred to as a parameter set. The SPS 752, the PPS 754, and the slice header 756 are types of Network Abstraction Layer (NAL) units. A NAL unit is a syntax structure containing an indication of the type of data to follow (e.g., coded video data). NAL units are classified into video coding layer (VCL) and non-VCL NAL units. The VCL NAL units contain the data that represents the values of the samples in the video pictures, and the non-VCL NAL units contain any associated additional information such as parameter sets (important header data that can apply to a large number of VCL NAL units) and supplemental enhancement information (timing information and other supplemental data that may enhance usability of the decoded video signal but are not necessary for decoding the values of the samples in the video pictures). Those skilled in the art will appreciate that the bitstream 750 may contain other parameters and information in practical applications.

The image data 758 of FIG. 7 comprises data associated with the images or video being encoded or decoded. The image data 758 may be simply referred to as the payload or data being carried in the bitstream 750. In an embodiment, the image data 758 comprises the CVS 708 containing a GDR picture 702, one or more trailing pictures 704, and a recovery point picture 706. In an embodiment, the GDR picture 702, the trailing pictures 704, and the recovery point picture 706 may define a GDR period in the CVS 708.

As shown in FIG. 7, the GDR technique 700 or principle works over a series of pictures starting with the GDR picture 702 and ending with the recovery point picture 706. The GDR picture 702 contains a refreshed/clean region 710 containing blocks that have all be coded using intra prediction (i.e., intra-predicted blocks) and an un-refreshed/dirty region 712 containing blocks that have all be coded using inter prediction (i.e., inter-predicted blocks).

The trailing picture 704 immediately adjacent to the GDR picture 702 contains a refreshed/clean region 710 having a first portion 710A coded using intra prediction and a second portion 710B coded using inter prediction. The second portion 710B is coded by referencing the refreshed/clean region 710 of, for example, a preceeding picture within the GDR period of the CVS 708. As shown, the refreshed/clean region 710 of the trailing pictures 704 expands as the coding process moves or progresses in a consistent direction (e.g., from left to right), which correspondingly shrinks the un-refreshed/dirty region 712. Eventually, the recovery point picture 706, which contains only the refreshed/clean region 710, is obtained from the coding process. The second portion 710B of the refreshed/clean region 710, which is coded as inter-predicted blocks, may only refer to the refreshed region/clean region 710 in the reference picture.

As shown in FIG. 7, the GDR picture 702, the trailing pictures 704, and the recovery point picture 706 in the CVS 708 are each contained within their own VCL NAL unit 730. The set of VCL NAL units 730 in the CVS 708 may be referred to as an access unit.

The NAL unit 730 containing the GDR picture 702 in the CVS 708 has a GDR NAL unit type (GDR_NUT). That is, in an embodiment the NAL unit 730 containing the GDR picture 702 in the CVS 708 has its own unique NAL unit type relative to the trailing pictures 704 and the recovery point picture 706. In an embodiment, the GDR_NUT permits the bitstream to begin with the GDR picture 702 instead of the bitstream having to begin with an IRAP picture. Designating the VCL NAL unit 730 of the GDR picture 702 as a GDR_NUT may indicate to, for example, a decoder that the initial VCL NAL unit 730 in the CVS 708 contains the GDR picture 702.

In an embodiment, the GDR picture 702 is the initial picture in the CVS 708. In an embodiment, the GDR picture 702 is the initial picture in the GDR period. In an embodiment, the GDR picture 702 has a temporal identifier (ID) equal to zero. The temporal ID is value or number that identifies the position or order of a picture relative to other pictures. In an embodiment, an access unit containing the VCL NAL unit 730 having the GDR_NUT is designated a GDR access unit. In an embodiment, the GDR picture 702 is a code slice of another (e.g., larger) GDR picture. That is, the GDR picture 702 may be a portion of a larger GDR picture.

Figure 8:
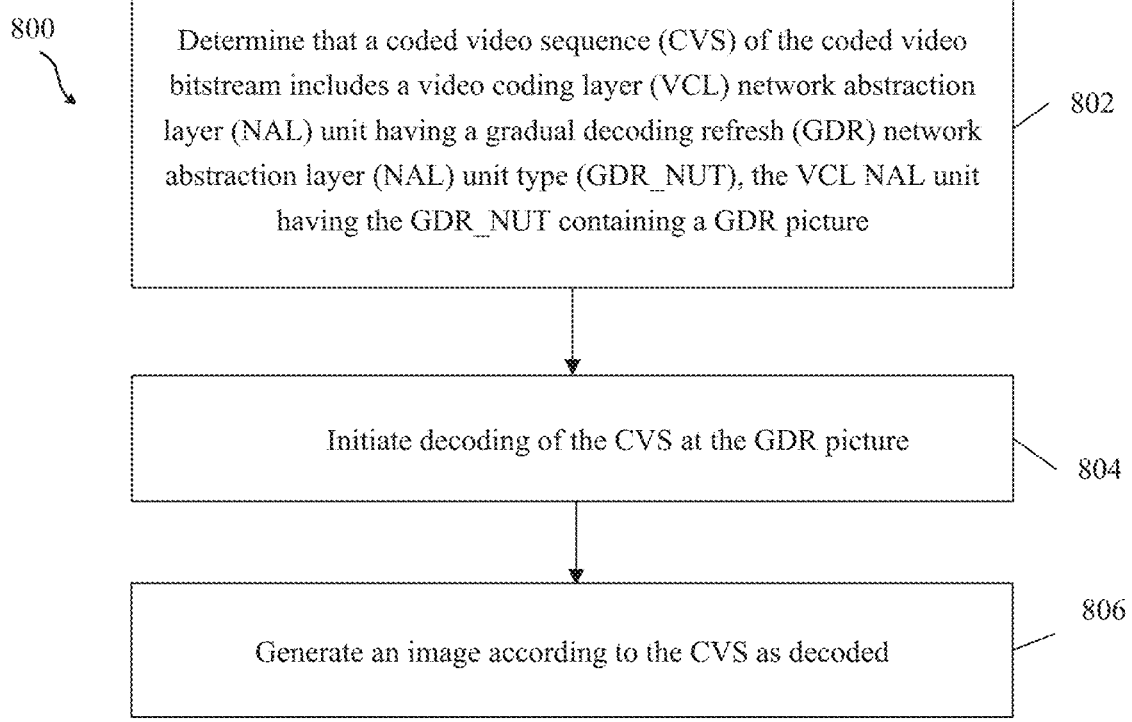
FIG. 8 is an embodiment of a method of decoding a coded video bitstream.

FIG. 8 is an embodiment of a method 800 of decoding a coded video bitstream implemented by a video decoder (e.g., video decoder 30). The method 800 may be performed after the decoded bitstream has been directly or indirectly received from a video encoder (e.g., video encoder 20). The method 800 improves the decoding process because the method allows progressive intra refresh to enable random access without having to use an IRAP picture. By using a GDR picture instead of an IRAP picture, a smoother, more consistent bitrate may be achieved due to, for example, the size of a GDR picture relative to the size of an IRAP picture, which allows for reduced end to end delay (i.e., latency). Therefore, as a practical matter, the performance of a codec is improved, which leads to a better user experience.

In block 802, the video decoder determines that a coded video sequence (CVS) of the coded video bitstream includes a video coding layer (VCL) network abstraction layer (NAL) unit having a gradual decoding refresh (GDR) network abstraction layer (NAL) unit type (GDR_NUT), the VCL NAL unit having the GDR_NUT containing a GDR picture.

In an embodiment, the GDR picture is an initial picture in the CVS. In an embodiment, the GDR picture is an initial picture in a GDR period. In an embodiment, the GDR picture has a temporal identifier (ID) equal to zero. The temporal ID of zero may indicate that the GDR picture is the first picture in, for example, the CVS or GDR period. In an embodiment, an access unit containing the VCL NAL unit having the GDR_NUT is designated a GDR access unit. In an embodiment, the GDR picture is a coded slice of another GDR picture.

In block 804, the video decoder initiates decoding of the CVS at the GDR picture.

In block 806, the video decoder generates an image according to the CVS as decoded. The image may then be displayed for a user of an electronic device (e.g., a smart phone, tablet, laptop, personal computer, etc.).

Figure 9:
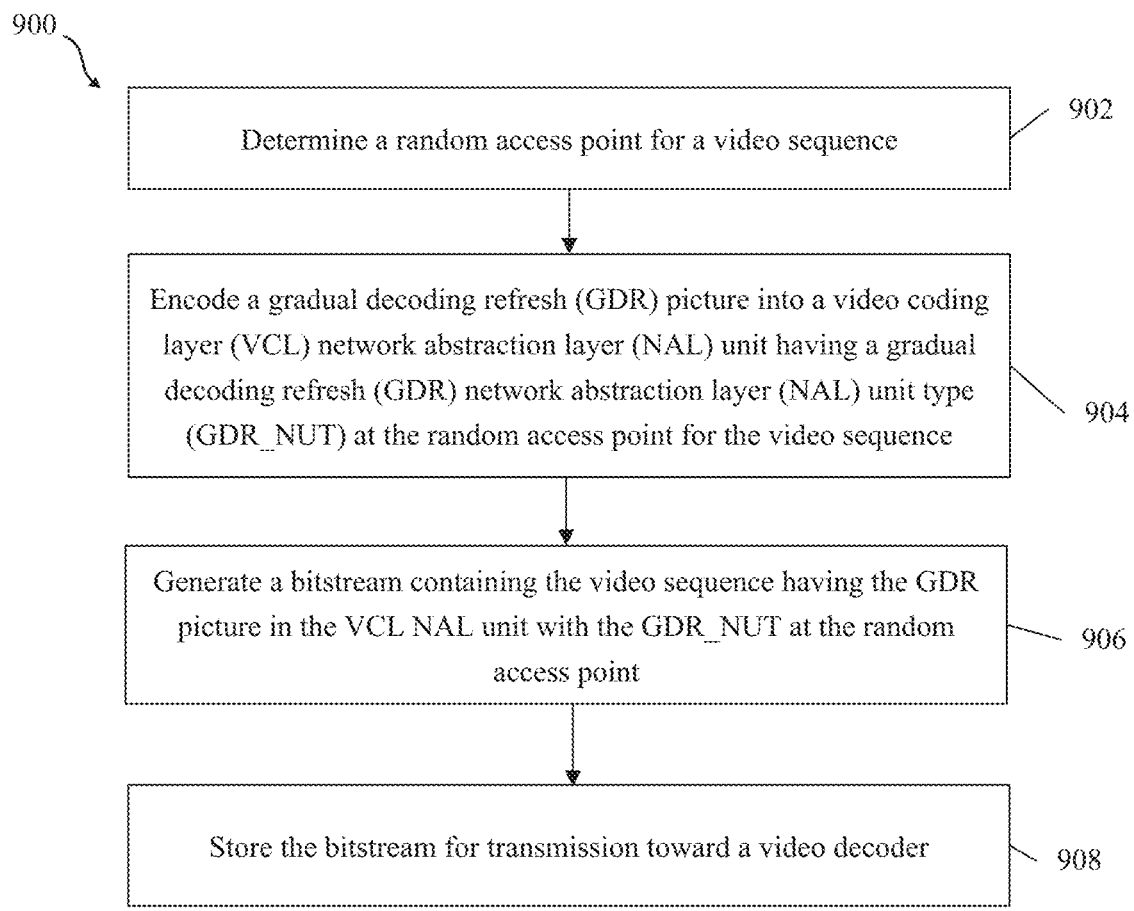
FIG. 9 is an embodiment of a method of encoding a video bitstream.

FIG. 9 is an embodiment of a method 900 of encoding a video bitstream implemented by a video encoder (e.g., video encoder 20). The method 900 may be performed when a picture (e.g., from a video) is to be encoded into a video bitstream and then transmitted toward a video decoder (e.g., video decoder 30). The method 900 improves the encoding process because the method allows progressive intra refresh to enable random access without having to use an IRAP picture. By using a GDR picture instead of an IRAP picture, a smoother, more consistent bitrate may be achieved due to, for example, the size of a GDR picture relative to the size of an IRAP picture, which allows for reduced end to end delay (i.e., latency). Therefore, as a practical matter, the performance of a codec is improved, which leads to a better user experience.

In block 902, the video encoder determines a random access point for a video sequence. In block 904, the video encoder encodes a gradual decoding refresh (GDR) picture into a video coding layer (VCL) network abstraction layer (NAL) unit having a gradual decoding refresh (GDR) network abstraction layer (NAL) unit type (GDR_NUT) at the random access point for the video sequence.

In an embodiment, the GDR picture is an initial picture in the CVS. In an embodiment, the GDR picture is an initial picture in a GDR period. In an embodiment, the GDR picture has a temporal identifier (ID) equal to zero. The temporal ID of zero may indicate that the GDR picture is the first picture in, for example, the CVS or GDR period. In an embodiment, an access unit containing the VCL NAL unit having the GDR_NUT is designated a GDR access unit. In an embodiment, the GDR picture is a coded slice of another GDR picture.

In block 906, the video encoder generates a bitstream containing the video sequence having the GDR picture in the VCL NAL unit with the GDR_NUT at the random access point.

In block 908, the bitstream is stored for transmission toward a video decoder. The video bitstream may also be referred to as a coded video bitstream or an encoded video bitstream. The video encoder can transmit the bitstream toward the video decoder. Once received by the video decoder, the encoded video bitstream may be decoded (e.g., as described above) to generate or produce an image for display to a user on the display or screen of an electronic device (e.g., a smart phone, tablet, laptop, personal computer, etc.).

Figure 10:
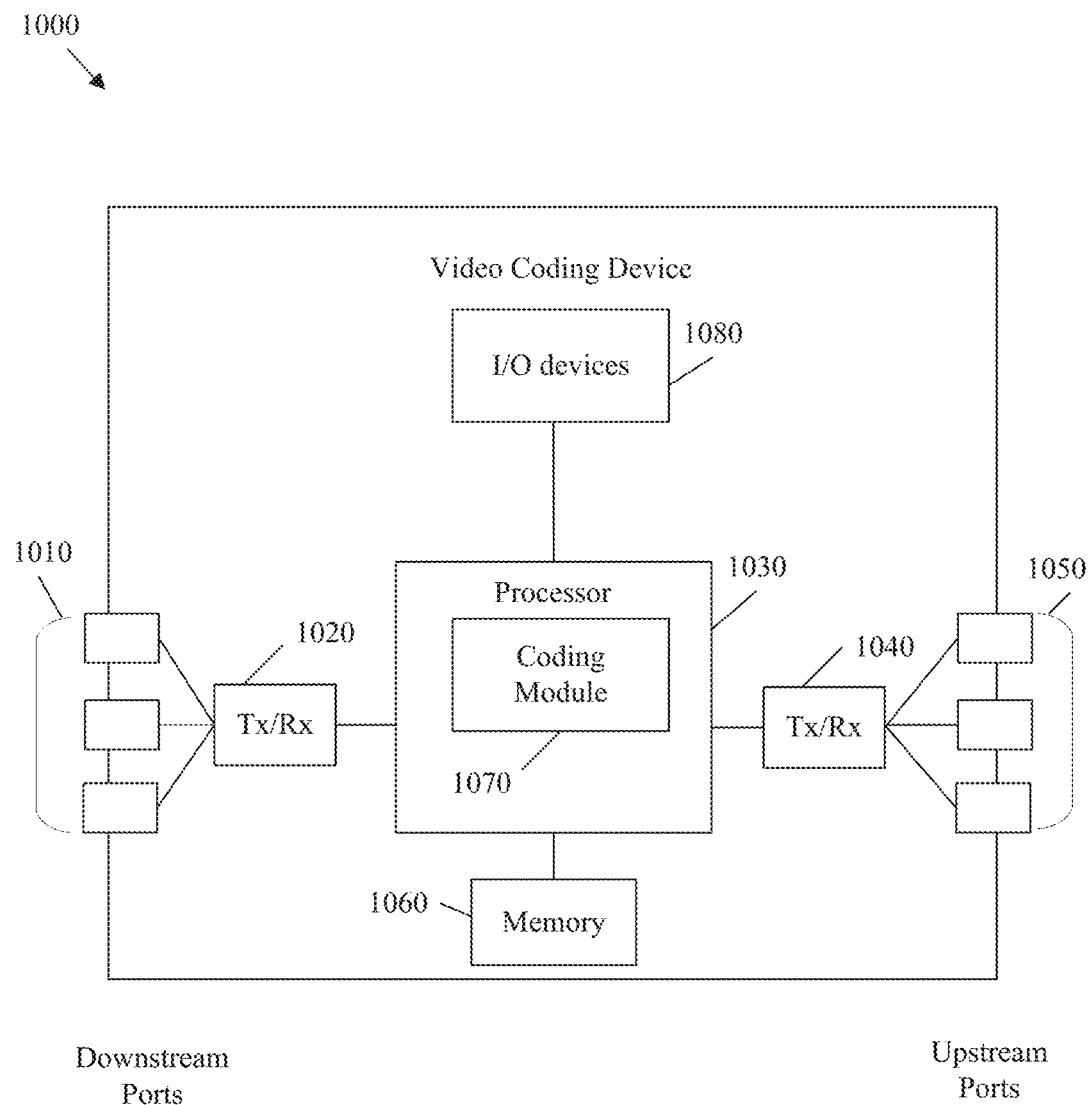
FIG. 10 is a schematic diagram of a video coding device.

FIG. 10 is a schematic diagram of a video coding device 1000 (e.g., a video encoder 20 or a video decoder 30) according to an embodiment of the disclosure. The video coding device 1000 is suitable for implementing the disclosed embodiments as described herein. The video coding device 1000 comprises ingress ports 1010 and receiver units (Rx) 1020 for receiving data; a processor, logic unit, or central processing unit (CPU) 1030 to process the data; transmitter units (Tx) 1040 and egress ports 1050 for transmitting the data; and a memory 1060 for storing the data. The video coding device 1000 may also comprise optical-to-electrical (OE) components and electrical-to-optical (EO) components coupled to the ingress ports 1010, the receiver units 1020, the transmitter units 1040, and the egress ports 1050 for egress or ingress of optical or electrical signals.

The processor 1030 is implemented by hardware and software. The processor 1030 may be implemented as one or more CPU chips, cores (e.g., as a multi-core processor), field-programmable gate arrays (FPGAs), application specific integrated circuits (ASICs), and digital signal processors (DSPs). The processor 1030 is in communication with the ingress ports 1010, receiver units 1020, transmitter units 1040, egress ports 1050, and memory 1060. The processor 1030 comprises a coding module 1070. The coding module 1070 implements the disclosed embodiments described above. For instance, the coding module 1070 implements, processes, prepares, or provides the various codec functions. The inclusion of the coding module 1070 therefore provides a substantial improvement to the functionality of the video coding device 1000 and effects a transformation of the video coding device 1000 to a different state. Alternatively, the coding module 1070 is implemented as instructions stored in the memory 1060 and executed by the processor 1030.

The video coding device 1000 may also include input and/or output (I/O) devices 1080 for communicating data to and from a user. The I/O devices 1080 may include output devices such as a display for displaying video data, speakers for outputting audio data, etc. The I/O devices 1080 may also include input devices, such as a keyboard, mouse, trackball, etc., and/or corresponding interfaces for interacting with such output devices.

The memory 1060 comprises one or more disks, tape drives, and solid-state drives and may be used as an over-flow data storage device, to store programs when such programs are selected for execution, and to store instructions and data that are read during program execution. The memory 1060 may be volatile and/or non-volatile and may be read-only memory (ROM), random access memory (RAM), ternary content-addressable memory (TCAM), and/or static random-access memory (SRAM).

Figure 11:
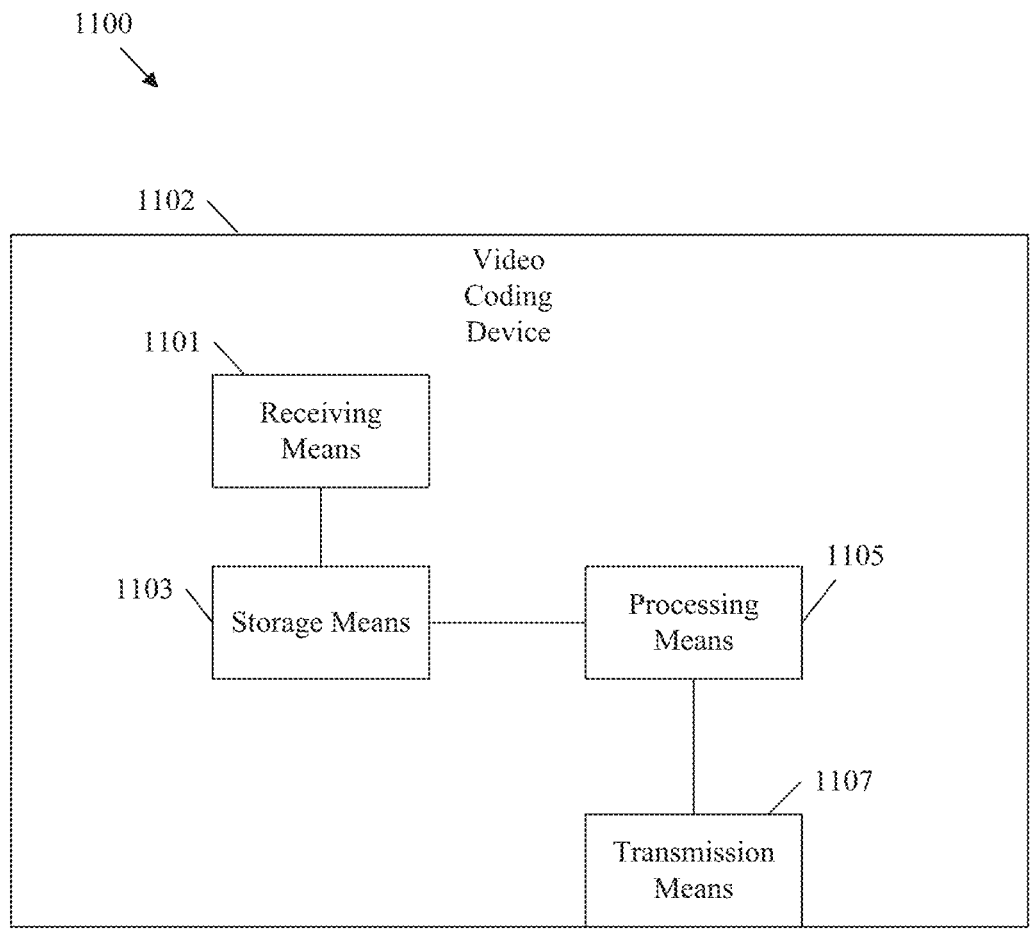
FIG. 11 is a schematic diagram of an embodiment of a means for coding.

FIG. 11 is a schematic diagram of an embodiment of a means for coding 1100. In an embodiment, the means for coding 1100 is implemented in a video coding device 1102 (e.g., a video encoder 20 or a video decoder 30). The video coding device 1102 includes receiving means 1101. The receiving means 1101 is configured to receive a picture to encode or to receive a bitstream to decode. The video coding device 1102 includes transmission means 1107 coupled to the receiving means 1101. The transmission means 1107 is configured to transmit the bitstream to a decoder or to transmit a decoded image to a display means (e.g., one of the I/O devices 1080).

The video coding device 1102 includes a storage means 1103. The storage means 1103 is coupled to at least one of the receiving means 1101 or the transmission means 1107. The storage means 1103 is configured to store instructions. The video coding device 1102 also includes processing means 1105. The processing means 1105 is coupled to the storage means 1103. The processing means 1105 is configured to execute the instructions stored in the storage means 1103 to perform the methods disclosed herein.

It should also be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A non-transitory storage medium storing an encoded bitstream for video signals, wherein the encoded bitstream comprises a plurality of syntax elements,
    wherein the plurality of syntax elements comprises a coded video sequence (CVS) including a video coding layer (VCL) network abstraction layer (NAL) unit,
    wherein the VCL NAL unit has a gradual decoding refresh (GDR) network abstraction layer (NAL) unit type (GDR_NUT),
    wherein a GDR access unit corresponding to the VCL NAL unit is a CVS start access unit, and
    wherein a GDR picture corresponds to the GDR_NUT.

2. The non-transitory storage medium of claim 1, wherein the GDR picture is a first picture in the CVS.

3. The non-transitory storage medium of claim 1, wherein the GDR picture is an initial picture in a GDR period.

4. The non-transitory storage medium of claim 1, wherein the GDR picture has a temporal identifier (ID) equal to zero.

5. The non-transitory storage medium of claim 1, wherein the GDR NUT indicates to a decoder that the VCL NAL unit having the GDR NUT contains a slice of the GDR picture.

6. A video encoder comprising:
    a processor configured to:
        determine a random access point for a video sequence;
        encode a gradual decoding refresh (GDR) picture into a video coding layer (VCL) network abstraction layer (NAL) unit at the random access point for the video sequence;
        generate a bitstream containing the video sequence having the GDR picture at the random access point, wherein the VCL NAL unit has a gradual decoding refresh (GDR) network abstraction layer (NAL) unit type (GDR_NUT), wherein a GDR access unit corresponding to the VCL NAL unit is a coded video sequence (CVS) start access unit; and
    a memory coupled to the processor and configured to store the bitstream.

7. The video encoder of claim 6, wherein the GDR picture is a first picture in the CVS.

8. The video encoder of claim 6, wherein the GDR picture is an initial picture in a GDR period.

9. The video encoder of claim 6, wherein the GDR picture has a temporal identifier (ID) equal to zero.

10. The video encoder of claim 6, wherein the GDR_NUT indicates to a decoder that the VCL NAL unit having the GDR_NUT contains a slice of the GDR picture.

11. A method of decoding a coded video bitstream implemented by a video decoder, comprising:
    receiving the coded video bitstream, wherein the coded video bitstream comprises a coded video sequence (CVS) including a plurality of video coding layer (VCL) network abstraction layer (NAL) units, wherein each VCL NAL unit has a gradual decoding refresh (GDR) NAL unit type (GDR_NUT), wherein the plurality of VCL NAL units have the GDR_NUT containing a coded GDR picture, and wherein an access unit containing the plurality of VCL NAL units having the GDR_NUT is designated a GDR access unit; and
    starting decoding of the CVS from the coded GDR picture.

12. The method of claim 11, wherein the GDR picture is an initial picture in the CVS.

13. The method of claim 11, wherein the GDR picture is an initial picture in a GDR period.

14. The method of claim 11, wherein the GDR picture has a temporal identifier (ID) equal to zero.

15. The method of claim 11, wherein the GDR NUT indicates to the video decoder that the plurality of VCL NAL units having the GDR NUT contain the coded GDR picture.

* * * * *

UNITED STATES PATENT AND TRADEMARK OFFICE
CERTIFICATE OF CORRECTION

| | | |
|---|---|---|
| PATENT NO. | : 11,973,939 B2 | Page 1 of 1 |
| APPLICATION NO. | : 18/156943 | |
| DATED | : April 30, 2024 | |
| INVENTOR(S) | : Fnu Hendry et al. | |

It is certified that error appears in the above-identified patent and that said Letters Patent is hereby corrected as shown below:

In the Claims

Column 41, Claim 5, Lines 34-36, should read:
5. The non-transitory storage medium of claim 1, wherein the GDR_NUT indicates to a decoder that the VCL NAL unit having the GDR_NUT contains a slice of the GDR picture.

Column 42, Claim 15, Lines 40-43, should read:
15. The method of claim 11, wherein the GDR_NUT indicates to the video decoder that the plurality of VCL NAL units having the GDR_NUT contain the coded GDR picture.

Signed and Sealed this
Eleventh Day of June, 2024

Katherine Kelly Vidal
*Director of the United States Patent and Trademark Office*